(12) United States Patent
Smith et al.

(10) Patent No.: US 12,106,907 B2
(45) Date of Patent: *Oct. 1, 2024

(54) ELECTRICALLY INSULATING CONTINUOUS FILM FOR AN ALUMINUM ELECTROLYTIC CAPACITOR

(71) Applicant: Pacesetter, Inc., Sylmar, CA (US)

(72) Inventors: J. Brian Smith, Pickens, SC (US); Ralph Jason Hemphill, Sunset, SC (US); David Bowen, Taylors, SC (US); Thomas F. Strange, Easley, SC (US)

(73) Assignee: Pacesetter, Inc., Sylmar (CA)

( * ) Notice: Subject to any disclaimer, the term of this patent is extended or adjusted under 35 U.S.C. 154(b) by 29 days.

This patent is subject to a terminal disclaimer.

(21) Appl. No.: 17/518,586

(22) Filed: Nov. 4, 2021

(65) Prior Publication Data
US 2022/0059293 A1    Feb. 24, 2022

Related U.S. Application Data

(63) Continuation of application No. 16/412,006, filed on May 14, 2019, now Pat. No. 11,195,666.
(Continued)

(51) Int. Cl.
| | | |
|---|---|---|
| *H01G 9/10* | (2006.01) | |
| *H01G 9/02* | (2006.01) | |
| *H01G 9/055* | (2006.01) | |
| *H01G 9/145* | (2006.01) | |
| *H01G 9/00* | (2006.01) | |
| *H01G 9/045* | (2006.01) | |

(52) U.S. Cl.
CPC ............... *H01G 9/10* (2013.01); *H01G 9/02* (2013.01); *H01G 9/055* (2013.01); *H01G 9/0029* (2013.01); *H01G 9/045* (2013.01); *H01G 9/145* (2013.01)

(58) Field of Classification Search
CPC  H01G 9/10; H01G 9/08; H01G 9/045; H01G 9/055; H01G 9/145; H01G 9/02
See application file for complete search history.

(56) References Cited

U.S. PATENT DOCUMENTS

| | | |
|---|---|---|
| 6,032,075 A | 2/2000 | Pignato et al. |
| 6,141,205 A | 10/2000 | Nutzman et al. |
| (Continued) | | |

OTHER PUBLICATIONS

Ramaswamy, Arun, Non-Final Office Action, U.S. Appl. No. 15/873,044, United States Patent and Trademark Office, May 1, 2019, 13 pages.

*Primary Examiner* — David M Sinclair
(74) *Attorney, Agent, or Firm* — Armstrong Teasdale LLP

(57) ABSTRACT

A device includes an electrode stack including a plurality of conductive anodes, a plurality of conductive cathodes, a plurality of separators arranged between the conductive anodes and the conductive cathodes, and a dielectric material disposed on a surface of each of the conductive anodes. The stack has a top surface, a bottom surface, and an edge extending between the top surface and the bottom surface. A continuous electrically insulating film overlies the edge, peripheral portions of the top surface and peripheral portions of the bottom surface so that a central portion of the top surface and a central portion of the bottom surface are exposed. An electrolyte is disposed between the conductive anodes and the conductive cathodes.

17 Claims, 24 Drawing Sheets

Related U.S. Application Data

(60) Provisional application No. 62/691,277, filed on Jun. 28, 2018.

(56) References Cited

U.S. PATENT DOCUMENTS

| | | |
|---|---|---|
| 6,321,114 B1 | 11/2001 | Nutzman et al. |
| 6,678,559 B1 | 1/2004 | Breyen et al. |
| 6,819,544 B1 | 11/2004 | Nielsen et al. |
| 7,426,104 B2 | 9/2008 | Dombro et al. |
| 7,699,899 B2 | 4/2010 | Dombro et al. |
| 8,179,663 B2 | 5/2012 | Brabeck et al. |
| 11,195,666 B2 * | 12/2021 | Smith .................. H01G 9/055 |
| 2004/0141281 A1 | 7/2004 | Takaoka et al. |
| 2005/0117277 A1 | 6/2005 | Norton et al. |
| 2005/0264976 A1 | 12/2005 | Hill |
| 2005/0264979 A1 * | 12/2005 | Breyen ................ H01G 9/004 |
| | | 361/517 |
| 2006/0061938 A1 | 3/2006 | Dombro et al. |
| 2008/0068779 A1 * | 3/2008 | Restorff ................ H01G 11/52 |
| | | 361/508 |
| 2010/0216027 A1 | 8/2010 | Fuji |
| 2013/0027847 A1 | 1/2013 | Aoyama et al. |
| 2015/0140401 A1 | 5/2015 | Minagata |
| 2016/0310748 A1 | 10/2016 | Aamodt |
| 2016/0322626 A1 | 11/2016 | Okuda et al. |
| 2017/0110255 A1 | 4/2017 | Bowen et al. |

* cited by examiner

ELECTRICALLY INSULATING CONTINUOUS FILM FOR AN ALUMINUM ELECTROLYTIC CAPACITOR

RELATED APPLICATIONS

This Application is a continuation of U.S. patent application Ser. No. 16/412,006, filed on May 14, 2019, entitled "Electrically Insulating Continuous Film for an Aluminum Electrolytic Capacitor," and incorporated herein in its entirety; and U.S. patent application Ser. No. 16/412,006 claims the benefit of U.S. Provisional Patent Application Ser. No. 62/691,277, filed on Jun. 28, 2018, and incorporated herein in its entirety.

FIELD OF THE INVENTION

The present disclosure relates generally to the field of electrolytic capacitors and batteries.

BACKGROUND

Compact, high voltage capacitors are utilized as energy storage reservoirs in many applications, including implantable medical devices. These capacitors are required to have a high energy density, since it is desirable to minimize the overall size of the implanted device. This is particularly true of an Implantable Cardioverter Defibrillator (ICD), also referred to as an implantable defibrillator, since the high voltage capacitors used to deliver the defibrillation pulse can occupy as much as one third of the ICD volume.

Stacked electrolytic capacitors are typically constructed with a plurality of anodes and cathodes, which must be separated by a liquid absorbent insulating material, i.e., a separator, that is impregnated by an electrically conductive electrolyte. If the separator is not present as a line of sight barrier between any anode and adjacent cathode, there exists a danger of physical contact, as well as electrical breakdown of any incidental gasses present in the completed capacitor. Either of these scenarios would result in an undesirable partial or complete discharge event with a high probability of device failure.

Stacked electrolytic capacitors have utilized physical features in the constituent components of assembly with the aim of assuring precision of physical alignment such that the dimensions of those components leave physical margins that assure adequate separator coverage between all anodes and cathodes. Historically, those features have included holes in the separators, anodes, and cathodes in order to align with features on stacking fixtures when being assembled. These holes constitute undesirably lost surface area in each anode and cathode, which in turn requires compensation either in the number of anodes and cathodes, or in the overall physical outline of those components in order to achieve a given design capacitance in the finished part.

The stacked alignment holes result in an undesirably larger overall finished part than would otherwise be required. The stacked alignment holes also create isolated cavities in the finished part that can lead to gas rich, electrolyte starved regions ripe for latent failure. The edges of the holes or other features necessarily create more edge length and complexity of shape for each anode, which increases the challenge of removing them flaw free from the source anode sheet material.

Typically, the separator may be a pulp product, such as one produced by the kraft process in which wood is broken down by sodium hydroxide and sodium sulfide into a wood pulp, which comprises mostly cellulose fiber. A pulp product made by this kraft process is commonly called a Kraft paper.

In order to obtain high capacitance, material, such as aluminum in the case of an aluminum electrolytic capacitor, must be removed from an anode foil during an etching process to create tunnels and increase the surface area of the foil. A widening process opens the tunnels to prevent clogging during formation of an oxide on the anode foil. The etching and widening processes can remove as much as 50% to 60% of the material to create greater than 30 million tunnels per $cm^2$. After the formation of the oxide, the foil becomes very brittle.

The etched anode foil is punched by use of a mechanical die into an anode shape to conform to the necessary geometry of the capacitor case. The more material that is removed (i.e., resulting in higher surface area), the more difficult the foil is to punch without creating cracks and particles in the foil. For example, the edges of the punched foil can contain burrs and attached particles of the material that can penetrate and/or tear the separator, creating a short between the anode and the cathode that compromises the quality and life of the separator. The manufacture of anode foils in this manner presents challenges in separator design which can be addressed using more robust separator materials.

Once the stacked electrolytic capacitor is formed, it needs to have certain portions, such as the edges of the stack, insulated from the case in which the stack is enclosed in an implantable device. For example, one electrode type (i.e., cathode or anode) of the capacitor stack may contact the case, while the other electrode type is insulated from the case. To insulate the edge portions of the capacitor stack from the case, a manual taping process may be used in which a person tapes the edges of the capacitor stack with an insulating tape, such as Kapton®. Aside from the manual taping process being labor intensive, difficult to reproduce, and slow, the unexacting nature of this process can result in arcing between the stack and the case, resulting in device failure.

FIG. 14A depicts a D-shaped capacitor stack in which a tape has been manually applied to the edges of the stack and peripheral portions of the top and bottom surfaces. The tape can inadvertently stick to an area that it is not intended to, and when trying to correct the position of the tape the stack can be damaged, for example as illustrated in FIG. 14B, which shows material on the edges of the stack torn away by the tape.

FIG. 15A depicts a rectangular capacitor stack in which the oddly shaped ends are fitted with custom manufactured plastic boots, and tape is applied to the edges of the capacitor stack between the booted ends. The application of the boots and the tape is also a manual process, and is subject to the same problems as the prior example. For instance, as shown in FIG. 15B, when correcting the position of the tape, the materials on the edges of the stack can be damaged. Moreover, the custom manufactured plastic boots are expensive.

The manufacture of capacitor stacks in this manner presents challenges in capacitor design which must be addressed.

BRIEF SUMMARY

Devices having continuous electrically insulating films, and methods of making the same are disclosed herein.

One aspect of the present disclosure relates to a device. The device includes an electrode stack including a plurality of conductive anodes, a plurality of conductive cathodes, a plurality of separators arranged between the conductive anodes and the conductive cathodes, and a dielectric material disposed on a surface of each of the conductive anodes, the stack having a top surface, a bottom surface, and an edge extending between the top surface and the bottom surface; a continuous electrically insulating film overlying the edge, peripheral portions of the top surface and peripheral portions of the bottom surface, wherein a central portion of the top surface and a central portion of the bottom surface are exposed; and an electrolyte disposed between the conductive anodes and the conductive cathodes.

Another aspect of the present disclosure relates to a method of making a device. The method includes arranging a continuous shrinkable insulating film around a capacitor stack, the stack comprising a top surface, a bottom surface, and an edge extending between the top surface and the bottom surface, the stack including a plurality of conductive anodes, a plurality of conductive cathodes, a plurality of separators arranged between the conductive anodes and the conductive cathodes, and a dielectric material disposed on a surface of each of the conductive anodes; and shrinking the insulating film to form a continuous shrunken film overlying the edge and at least peripheral portions of the top surface and the bottom surface of the stack.

Another aspect of the present disclosure relates to another method of making a device. The method includes expanding an elastic insulating film and positioning the insulating film around a capacitor stack, the stack comprising a top surface, a bottom surface, and an edge extending between the top surface and the bottom surface, the stack including a plurality of conductive anodes, a plurality of conductive cathodes, a plurality of separators arranged between the conductive anodes and the conductive cathodes, and a dielectric material disposed on a surface of each of the conductive anodes; and contracting the insulating film, whereby the insulating film overlies the edge and at least peripheral portions of the top surface and the bottom surface of the stack.

Another aspect of the present disclosure relates to another device. The device, includes an electrode stack including a plurality of conductive anodes, a plurality of conductive cathodes, a plurality of separators arranged between the conductive anodes and the conductive cathodes, and a dielectric material disposed on a surface of each of the conductive anodes, the stack having a top surface, a bottom surface, and an edge extending between the top surface and the bottom surface, wherein the plurality of conductive cathodes and the plurality of separators are arranged in a plurality of cathode subassemblies, each of the cathode subassemblies including a first separator sheet, a second separator sheet, and at least one of the conductive cathodes, and wherein the first and the second separator sheets comprise a nanocellulose material; a continuous electrically insulating film overlying the edge, peripheral portions of the top surface and peripheral portions of the bottom surface, wherein a central portion of the top surface and a central portion of the bottom surface are exposed; and an electrolyte disposed between the conductive anodes and the conductive cathodes.

DETAILED DESCRIPTION

The following detailed description of capacitor and battery designs refers to the accompanying drawings that illustrate exemplary embodiments consistent with these devices. Other embodiments are possible, and modifications may be made to the embodiments within the spirit and scope of the methods and systems presented herein. Therefore, the following detailed description is not meant to limit the devices described herein. Rather, the scope of these devices is defined by the appended claims.

Figure 1:
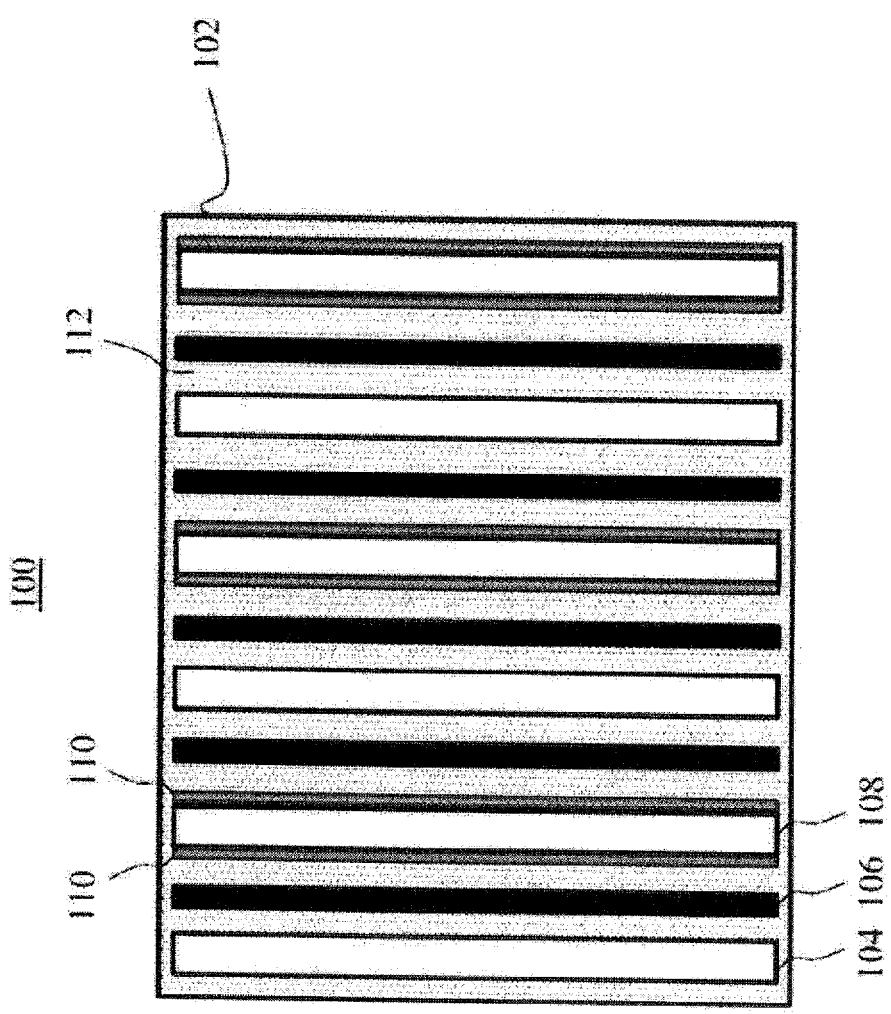
FIG. 1 illustrates a cross-section of an electrolytic capacitor or battery.

FIG. 1 illustrates a cross-sectional view of an electronic component 100 according to one embodiment of the disclosure. Electronic component 100 includes a housing 102 that contains a plurality of cathodes 104 alternating with a plurality of anodes 108, and separated by a plurality of separators (or spacers) 106. Each anode 108 includes a dielectric material 110 on or around an outer surface of anode 108. Dielectric material 110 may be an oxide that is thermally grown on, or deposited onto, the surface of anode 108. A high-k dielectric material may be used for dielectric material 110. A conductive electrolyte 112 fills the space between each of the elements within housing 102. Electrolyte 112 may be a polymer or liquid electrolyte as would be understood by one skilled in the art. Example electrolytes include ethylene glycol/boric acid-based electrolytes and anhydrous electrolytes based on organic solvents such as dimethylformamide (DMF), dimethylacetamide (DMA), or gamma-butyrolactone (GBL). The plurality of cathodes 104 may be electrically connected to a single, common cathode terminal, while the plurality of anodes 108 may be similarly connected to a single, common anode terminal.

Electronic component 100 may be, for example, an electrolytic capacitor or a battery. When electronic component 100 is used as a capacitor, example materials for the plurality of cathodes 104 include aluminum, titanium, and stainless steel, while example materials for the plurality of anodes 108 include aluminum and tantalum. When electronic component 100 is used as a battery, example materials for the plurality of cathodes 104 include silver vanadium oxide, carbon fluoride, magnesium oxide, or any combination thereof, while example materials for the plurality of anodes 108 include lithium metal.

Spacer 106 may be provided to maintain a given separation between each cathode 104 and an adjacent anode 108 within housing 102. Additionally, spacer 106 may be provided to prevent arcing between cathode 104 and anode 108 in spaces where dielectric 110 may be very thin or nonexistent, and/or where a void within electrolyte 112 exists between cathode 104 and anode 108.

Aligning each cathode 104, spacer 106, and anode 108 together in a stack is typically performed using physical features on each element that fit together (such as a peg-in-hole arrangement). As discussed above, this reduces the total usable surface area, which in turn reduces the overall energy density of electronic component 100.

It should be understood that the various elements and dimensions of electronic component 100 are not drawn to scale. Although each of cathode 104, separator 106, and anode 108 are illustrated as being apart from one another for the convenience of illustration and labeling, it would be understood by one skilled in the art that such elements may also be stacked together in close physical contact with one another.

FIGS. 2, 3, 4A, 4B and 4C illustrate a cathode subassembly 200 according to an embodiment of the present disclosure. Cathode subassembly 200 may include a cathode 202 sandwiched between two separator sheets 204 and 206, where the cathode 202 may be enclosed by the sheets 204, 206 except at a terminal or cathode tail 228 of the cathode 202 that extends out from the sheets 204, 206 so as not to be covered by the sheets 204, 206. Separator sheet 204 may be disposed across one surface of cathode 202, while separator sheet 206 may be disposed across the opposite surface of cathode 202. The separator sheets 204 and 206 may be sealed to each other at a sealing region 208 of the subassembly 200, which is at an outer periphery of the sheets 204 and 206. The sealing region 208 may surround the entirety of an outer periphery of the cathode 202, except for a portion of the outer periphery of the cathode 202 forming the cathode tail 228. The integral combination of the cathode sealed in a pocket between the two separator sheets substantially eliminates concern of contact between the cathode of the combination and other external electrodes. The cathode subassembly thus may be utilized in a stacked electrolytic capacitor configuration, as described below, without concern that the cathode therein may contact other external components resulting in a short, or may be or become improperly positioned, such as may occur due to misalignment of components during manufacture and handling of the stacked electrolytic capacitor configuration, to allow for arc discharge such as with an adjacent anode.

Cathode 202 may be commonly formed from a foil or plate made of a metal, such as aluminum, titanium or stainless steel. Cathode 202 may be any electrically conductive material that can be formed into a uniform, thin sheet. The cathode tail 228 may be an extension of the material of cathode 202, or may be a different material that is bonded to cathode 202. As used herein, the terms "foil," "sheet," and "plate" are used interchangeably to refer to a thin, planar material.

In one embodiment, each separator sheet 204 and 206 may include a high density Kraft paper. Other example materials include woven textiles made of one or a composite of several nonconductive fibers, such as aramid, polyolefin, polyamide, polytetrafluoroethylene, polypropylene, and glass. Separator sheets 204 and 206 should be porous enough that an electrolyte can penetrate through each separator sheet 204 and 206. Any insulating material that can be formed into a uniform, thin sheet with a porous structure may be used for separator sheet 204 and 206. The insulating material preferably shows no dissolution or shrinkage when introduced to the electrolyte. Similarly, when introduced to the electrolyte, the insulating material preferably does not elute any chemicals (e.g., corrosives or, in the case of aluminum electrolytic capacitors, halides) that would damage any part of a battery device over time, including the cathode subassembly.

Figure 2:
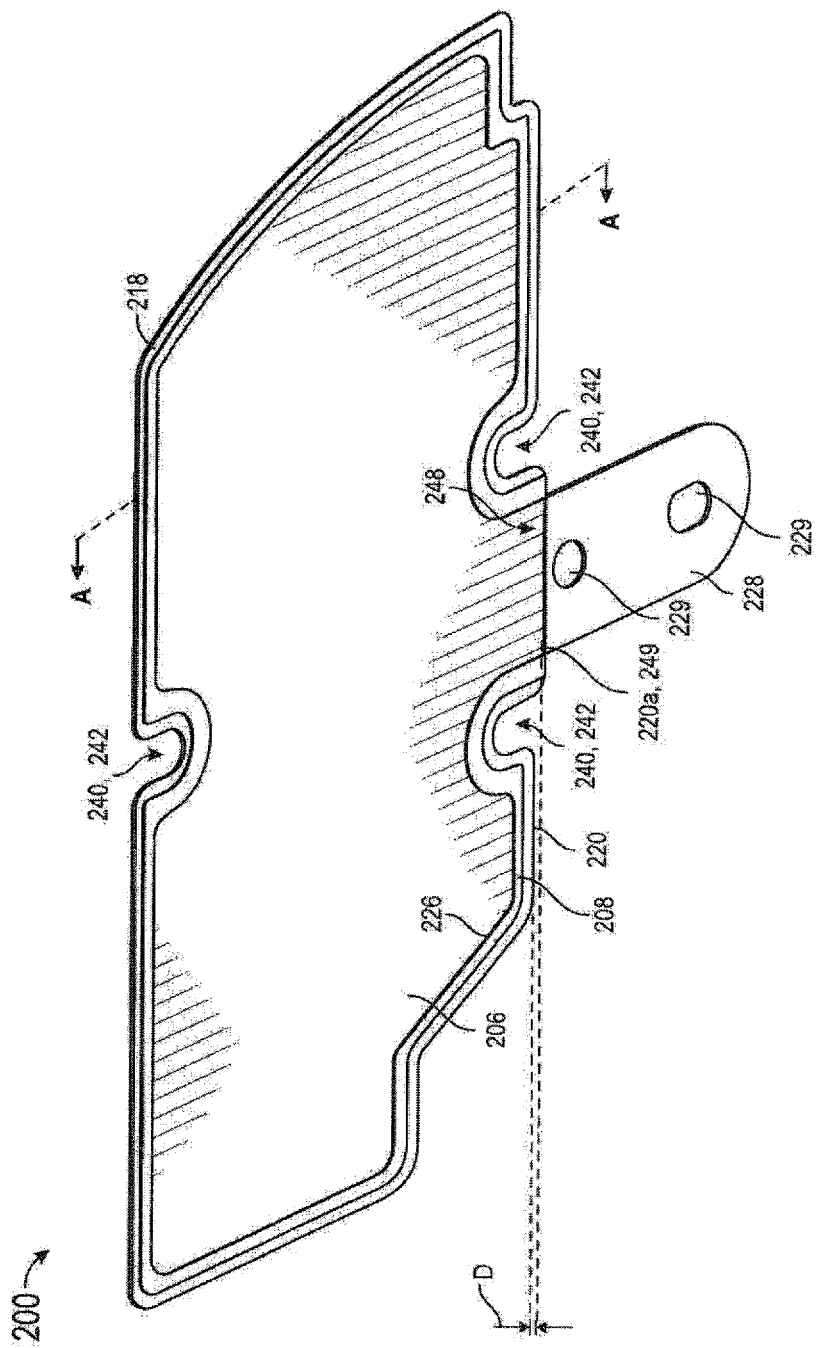
FIG. 2 is a perspective view of a cathode subassembly according to an embodiment of the present disclosure.
Figure 3:
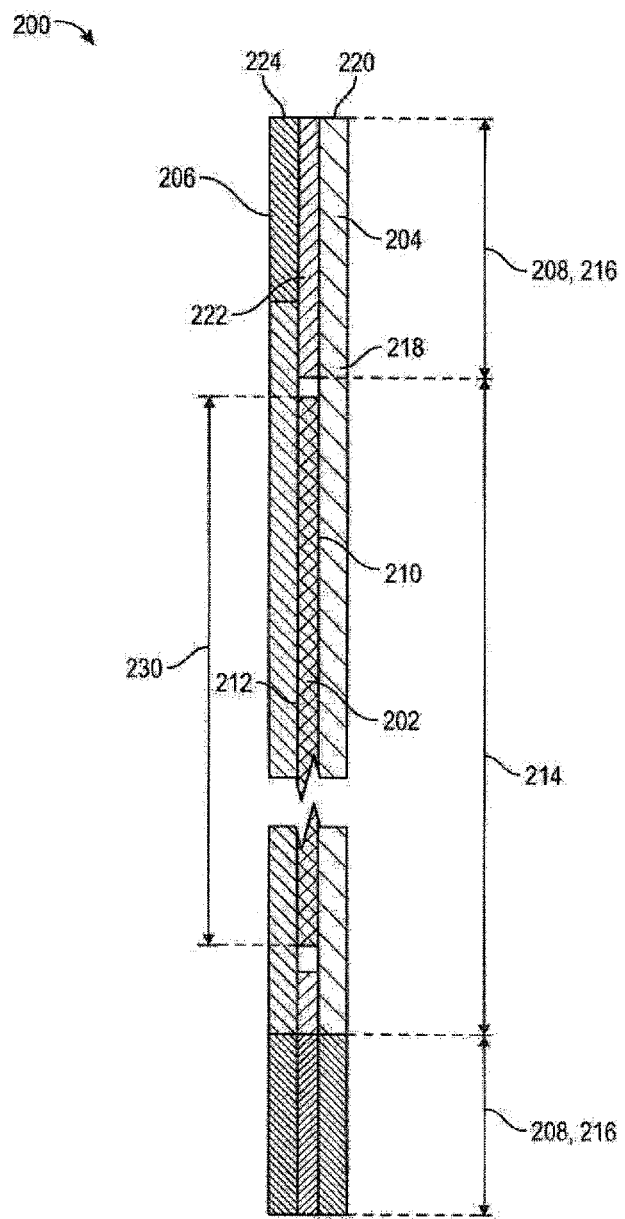
FIG. 3 is a cross-section of the cathode subassembly taken along line A-A of FIG. 2.
Figure 4A:
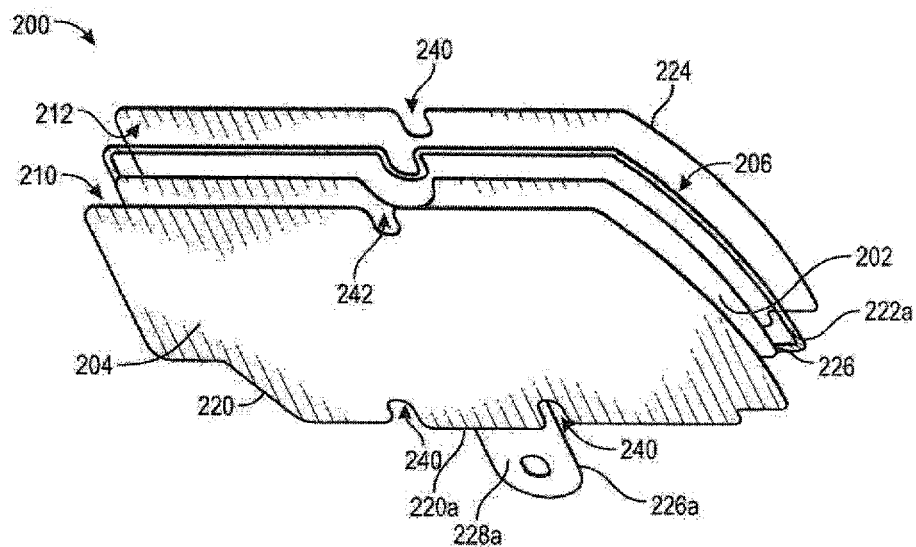
FIG. 4A is an exploded, perspective view of the cathode subassembly of FIG. 2.
Figure 4B:
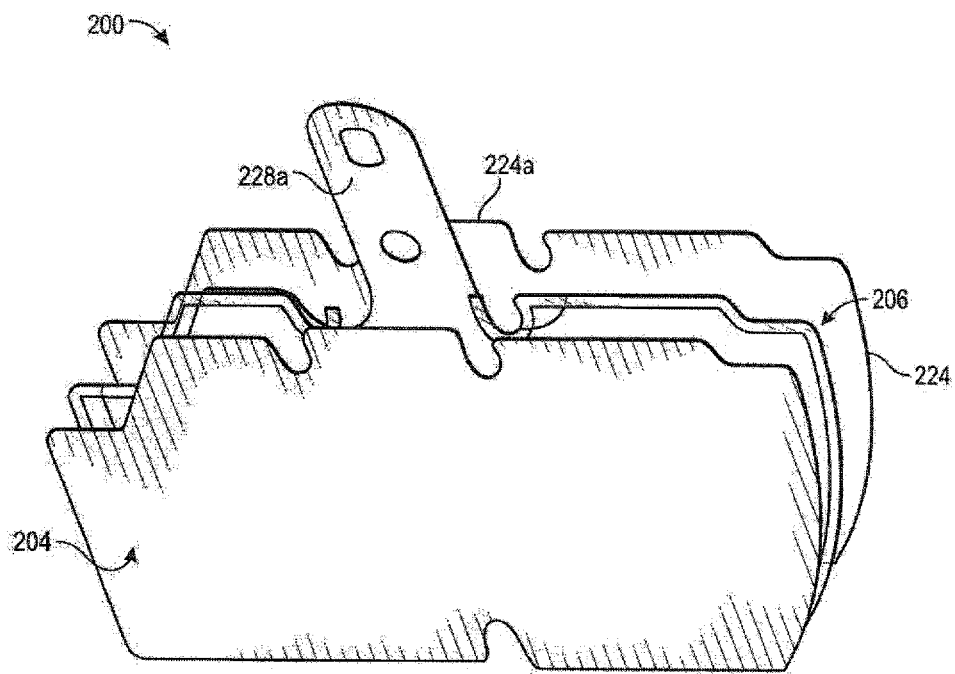
FIG. 4B is another exploded, perspective view of the cathode subassembly of FIG. 2.
Figure 4C:
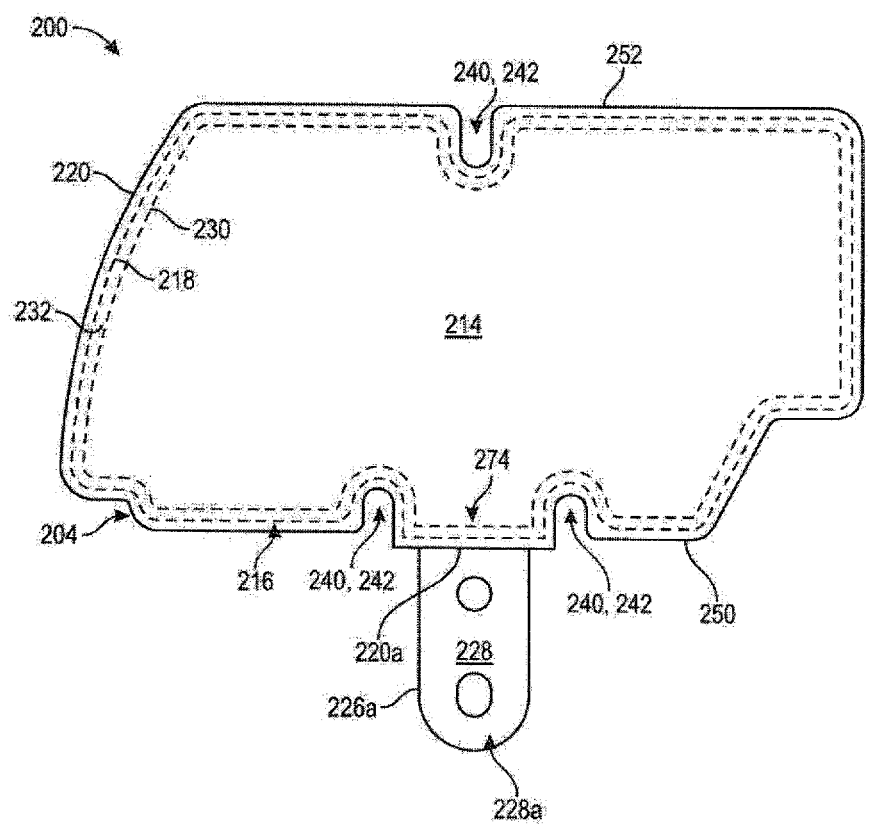
FIG. 4C is a plan view of the cathode subassembly of FIG. 2.

Referring to FIGS. 2, 3, 4A, 4B and 4C, where FIG. 4C includes dashed lines to indicate regions of an inner surface 210 of the sheet 204 as described below, the sheet 204 is bounded by a peripheral edge 220 including a peripheral edge portion 220a, and the sheet 206 is bounded by a peripheral edge 224 including a peripheral edge portion 224a. The cathode tail 228 extends out from the sheets 204, 206 at the edge portions 220a, 224a. The peripheral edges 220 and 224 are in alignment with each other and together form a peripheral edge of the subassembly 200, except at the portions 220a, 224a. The surface 210 of the sheet 204 may include a first region 214 and a second region 216, where the second region 216 surrounds the first region 214 except at a portion 274 of the first region 214 from which the cathode tail 228 extends out from the sheets 204, 206. The edge portions 220a, 224a are aligned with each other and form, at the portion 274, an outermost periphery of the sheets 204, 206 from which the cathode tail extends out from the sheets 204, 206. The first region 214 is bounded by the edge portion 220a and a perimeter 218 that extends, following a shape of the peripheral edge 220, from one end of the edge portion 220a to an opposite end of the edge portion 220a of the sheet 204. The second region 216 extends from the perimeter 218 of the first region 214 to the peripheral edge 220 of the sheet 204. The second region 216 is not present at the peripheral edge portion 220a.

Referring to FIGS. 2, 3, 4A, 4B and 4C, the sealing region 208 may be aligned with the second region 216, extending from the perimeter 218 to the peripheral edge 220. In addition, the sealing region 208 may include portions of the inner surface 212 of the sheet 206 which extend from the peripheral edge 224 of the sheet 206 and confront the second region 216. In one embodiment, the sealing region 208 may extend along an entirety of the peripheral edges 220, 224 of the sheets 204, 206 of the subassembly 200, except at the edge portions 220a, 224a.

The perimeter 218 of the first region 214 may have a contour corresponding to the shape of the portion of the peripheral edge 226 of the cathode 202 which is positioned within the region 214 between the sheets 204, 206. In some embodiments, the perimeter 218 may have a shape of any complexity, where the shape of the perimeter 218 corresponds to the shape of the outermost periphery of the portion of the cathode disposed within the first region 214.

Referring to FIGS. 3 and 4A, adhesive material 222 may be disposed in the sealing region 208. In one embodiment, at least a portion or the entirety of the surface 210 in the second region 216 extending from the perimeter 218 to the peripheral edge 220 may include adhesive material 222. The surface 210 in the first region 214 does not include adhesive material thereon. In the sealing region 208, the adhesive material 222 may extend from the surface 210 to a portion of the surface 212 of the sheet 206 confronting the second region 216. In some embodiments, the adhesive material 222 may extend to the peripheral edge 224 of the sheet 206.

In one embodiment, referring to FIGS. 3, 4A and 4B, the adhesive material 222 may be in the form of a strip 222a in the second region 216 which at least partially or completely follows the perimeter 218, and is disposed on the surface 210 extending from the perimeter 218 to the peripheral edge 220.

In one embodiment, the perimeter 218 may be spaced from facing portions of the peripheral edge 220 by a distance sufficient to provide satisfactory permanent sealing of the sheets to each other in the sealing region 208 by the adhesive material 222 in the sealing region 208. In some embodiments, the perimeter 218 may be spaced substantially the same distance from the facing portions of the edge 220 along the entire length of the perimeter 218, and in one embodiment such distance is about 0.02 inches.

According to an embodiment, the distance from the perimeter 218 to the facing portion of the peripheral edge of the subassembly 200 may be selected such that the distance is small enough to minimize the overall footprint of the portions of the separator sheets extending away from the peripheral edge 226 of the cathode, but large enough to ensure mechanical robustness and long-time reliability of the seal between the separator sheets in the sealing region.

Example adhesive materials 222 may include UV curable polymers, acrylic polymers, silicones, polyurethanes, polysulfides and cyanoacrylates. According to an embodiment, the adhesive material does not dissolve in the presence of an electrolyte and when introduced to the electrolyte does not elute any chemicals (e.g., corrosives or, in the case of aluminum electrolytic capacitors, halides) that would damage any part of a battery device over time. The adhesive material is selected and configured to provide a permanent bond between separator sheet 204 and separator sheet 206 in the sealing region 208, according to an embodiment.

In one embodiment, the thickness of the adhesive material 222 between the sheets 204 and 206 may be equal to or less than the thickness of the cathode 202. By maintaining the thickness of the adhesive material not more than the thickness of the cathode, a high packaging efficiency of the cathode subassembly, which may be combined with other components such as anodes, cathodes, separator sheets and additional cathode subassemblies in a stacked electrolytic capacitor configuration as described below, may be achieved.

Still referring to FIG. 4C, in one embodiment, the cathode 202 may have a shape and size such that, when the cathode 202 is disposed in the first region 214, the peripheral edge 226 of the cathode 202 is aligned with dashed line 230 in the first region 214. The line 230 is interior to and has the same or substantially the same configuration as the perimeter 218, and may be uniformly spaced about 0.02 inches from the perimeter 218. The portion of the surface 210 extending from the perimeter 218 to the line 230 defines a margin assembly region 232. The margin assembly region 232 may allow for manufacturing tolerance when the cathode 202 is disposed upon the surface 210, such as by an automated process or manually during manufacture of the subassembly 200 as discussed in detail below, such that the cathode 202 is disposed only within the region 214 and does not contact adhesive material 222 in the second region 216.

In one embodiment, the size of the portion of the cathode 202 disposed in the first region 214 is slightly smaller than the size of the first region 214, such that the cathode 202, except for the cathode tail 228, may fit entirely within the first region 214 and be spaced from the perimeter 218. In another embodiment, the cathode 202 may have a shape and size at the peripheral edge 226, such that the edge 226 is aligned or substantially aligned with the perimeter 218 when the cathode 202 is disposed in the first region 214.

In addition, referring to FIG. 2, in one embodiment, the cathode tail 228 may include apertures 229 extending entirely therethrough. The apertures 229 may provide additional means for aligning individual cathode subassemblies 200 with each other and with other components during manufacture of a stacked electrolytic capacitor configuration, as described below.

Further, the peripheral edges 220 and 224 may be configured to include one or more recessed portions 242 and 240, respectively, which are other than at the edge portions 220a and 224a, and which are aligned with each other. The recessed portions 240 and 242 desirably have an identical or substantially identical configuration, and each aligned pair of recessed portions 240, 242 together define an alignment region at the peripheral edge of the subassembly 200. The alignment region, for example, may be arcuate, semicircular or oblong, and may have a shape corresponding to an exterior surface of an alignment element, such as an alignment pin, used in the manufacture of a stacked electrolytic capacitor configuration including the cathode subassembly, as described below. Referring to FIGS. 2 and 4C, the perimeter 218 of the first region 214, the line 230 which defines an interior boundary of the margin assembly region 232, and the peripheral edge 226 of the cathode 202, at the alignment region(s) defined by the pair(s) of recessed portions 240, 242, may have a shape which is similar or identical to the shape of the alignment region(s). In some embodiments, the perimeter 218 of the first region 214 and the peripheral edge of the portion of the cathode within the first region 214 may have a shape corresponding to the shape of the peripheral edge of the subassembly 200, except at the portion of the peripheral edge of the subassembly 200 defined by the cathode tail 228.

In one embodiment, referring to FIG. 4C, alignment regions of the subassembly 200 may be positioned on a side 250 of the subassembly 200 from which the cathode tail 228 extends outwardly, and also on a side 252 of the subassembly 200 opposing the side 250. For example, the alignment regions may include, at the side 250, an alignment region at each end of the edge portions 220a, 224a, and another alignment region at the side 252 positioned opposite the cathode tail 228. It is to be understood that the alignment regions may be positioned anywhere along the peripheral edge of the subassembly 200, except at the portion of the peripheral edge of the subassembly 200 corresponding to a peripheral edge of the cathode tail 228.

Figure 5:
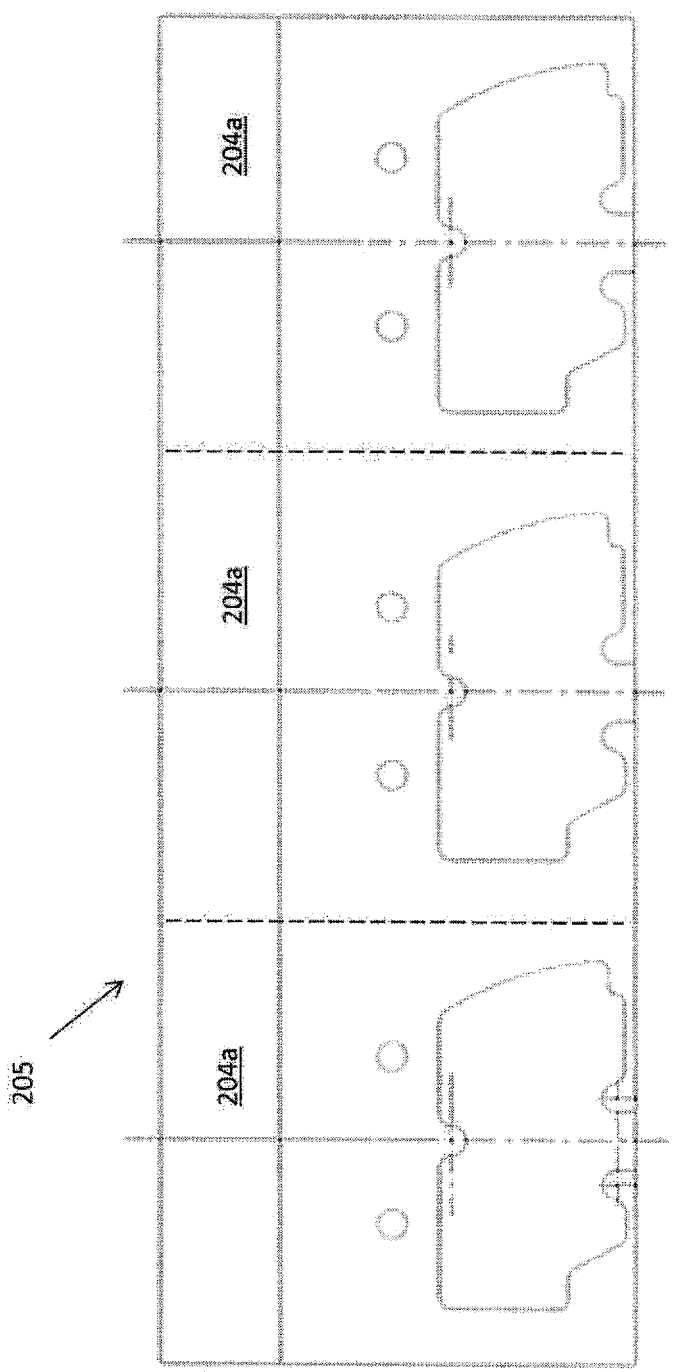
FIG. 5 is a plan view of a bulk separator roll including a plurality of first separator sheet cells for use in manufacture of cathode subassemblies according to an embodiment of the present disclosure.
Figure 6:
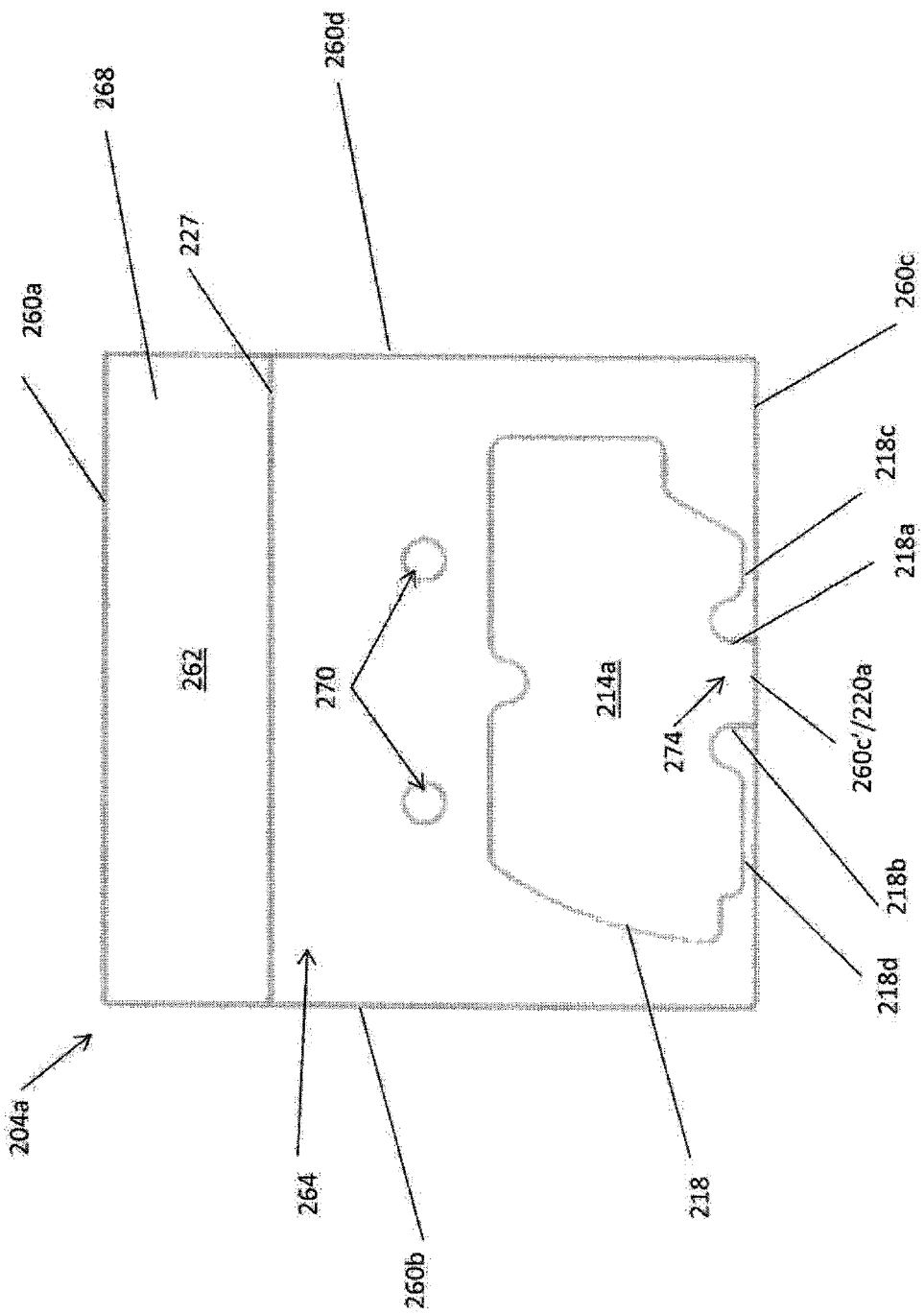
FIG. 6 is a plan view of a first separator sheet cell of the separator roll of FIG. 5 according to an embodiment of the present disclosure.

Referring to FIGS. 5 and 6, in one embodiment, the sheet 204 of the subassembly 200 may be obtained from a sheet roll 205 including a plurality of sheet cells 204a. Each sheet cell 204a may be square- or rectangularly-shaped with outer peripheral edges 260a, 260b, 260c and 260d, and may include regions 262 and 264. The region 262 may extend from the edge 260a to a perimeter 227 of the region 262, where the perimeter 227 extends from the edge 260b to the edge 260d. The region 264 may be defined by the perimeter 227, the edge 260c and the portions of the edges 260b and 260d extending from the perimeter 227 to the edge 260c. Adhesive material 222 may be disposed on surface 268 of the sheet cell 204a within the region 264, except in first region 214a of the surface 268 which is within the interior of the region 264. The first region 214a of the sheet cell 204a may have the same size and shape as the first region 214 of the subassembly 200. The first region 214a of the surface of the sheet cell 204a, on which the cathode 202 is disposed such that the cathode 202 does not extend beyond the perimeter 218 of the first region 214a (see FIG. 7), does not include adhesive material 222.

In some embodiments, the adhesive material may be provided on the separator sheet roll at the above described locations of the sheet cells 204a by, for example, selective application. In another embodiment, the adhesive material may be provided at the selected locations on sheet cells 204a by use of a pressure sensitive peel release liner that provides for selective removal of portions of an adhesive laminate that covers an entirety of a separator sheet roll.

In addition, in some embodiments, referring to FIG. 6, the sheet cell 204a may include apertures 270 extending entirely therethrough in a portion of the region 264 between the region 262 and the first region 214. The apertures 270 may provide means for holding and moving the roll 205, or individual sheet cells 204a of the roll 205, during a process of automated manufacture of the cathode subassembly.

In one embodiment, as shown in FIG. 6, an edge portion 260c' of edge 260c may define a peripheral edge of the first region 214 which extends between opposing portions 218a and 218b of the perimeter 218 that terminate at respective ends of the edge portion 260c'. The perimeter portions 218a and 218b are spaced from each other so as to define the region 274 within the region 214. The edge portion 260c' corresponds to the edge portion 220a of the sheet 204 of the subassembly 200 that is formed from the sheet cell 204a. As discussed above, and referring to FIGS. 2 and 7, the cathode tail 228 of the cathode may be disposed partially in the region 274 and extend out from the sheets 204, 206 at the region 274.

In one embodiment, referring to FIGS. 2, 4A, 4B, 4C, 6 and 7, the region 274 may be configured to have a size and shape such that the region 274 of the sheet 204, together with a portion of the sheet 206 aligned with the region 274, forms a protruding or extended separator sheet portion 248 of the subassembly 200 that overlies a portion of opposing surfaces 228a, 228b of the cathode tail 228. In the illustrated embodiment, referring to FIG. 6, portions 218c and 218d of the perimeter 218 may extend from the perimeter portions 218a and 218b, respectively, that are substantially parallel to the edges 260d and 260b and may be spaced from portions of the edge 260c that the perimeter portions 218c, 218d confront. The region 274 may be bounded by the edge portion 260c', which is co-linear with the portions of the edge 260c that the perimeter portions 218c, 218d confront. In one embodiment, referring to FIGS. 2 and 6, a line co-linear with each of the edge portion 220a (edge portion 260c') and the edge portion 224a may be spaced a distance D from adjacent portions of the peripheral edge of the subassembly 200, for example, the portions of the edges 220 and 224 that respectively confront the perimeter portions 218c, 218d, such that the extended separator sheet portion 248 protrudes a distance D in relation to adjacent portions of the peripheral edge of the subassembly 200. For example, the extended separator sheet portion 248 may project away from adjacent portions of the peripheral edge of the subassembly 200 a distance D in a direction substantially orthogonal to the adjacent portions of the peripheral edge of the subassembly 200 which confront the perimeter portions 218c, 218d, respectively, such that a peripheral edge 249 (edge portions 220a, 224a) of the extended separator sheet portion 248, at a furthest projecting point of the portion 248, protrudes, relative to the adjacent portions of the peripheral edge of the subassembly 200, a distance D in a direction substantially orthogonal to the adjacent portions of the peripheral edge of the subassembly 200. The extended separator sheet portion 248 of the subassembly 200 may advantageously avoid potential line of sight arcing discharge and contact between the portion of the cathode tail extending from the cathode subassembly and an anode plate arranged in a stacked electrolytic capacitor configuration adjacent or near to the cathode subassembly, during manufacture of a stacked electrolytic capacitor configuration as described below.

Figure 7:
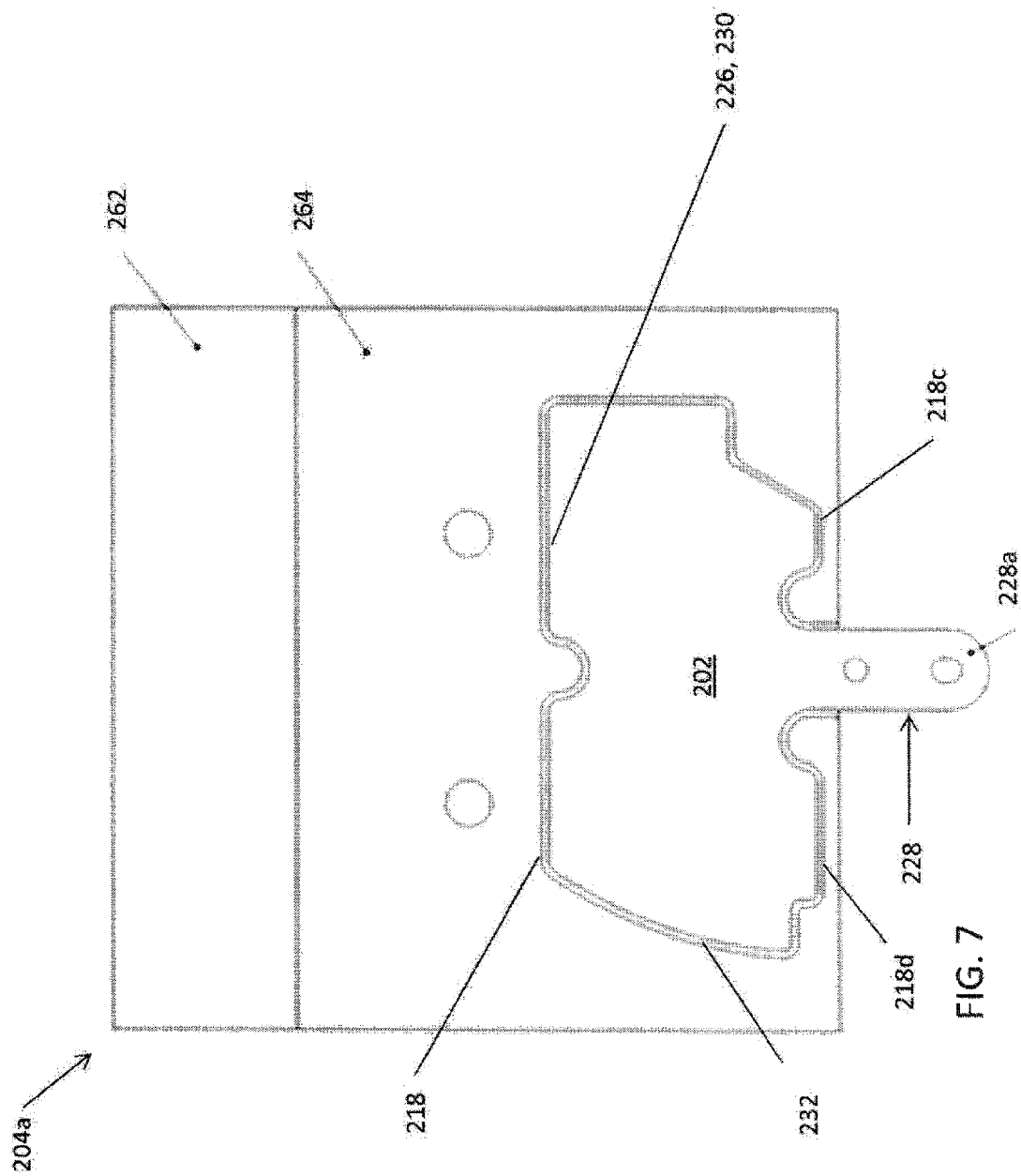
FIG. 7 is a plan view of a partially manufactured cathode subassembly according to an embodiment of the present disclosure.
Figure 8:
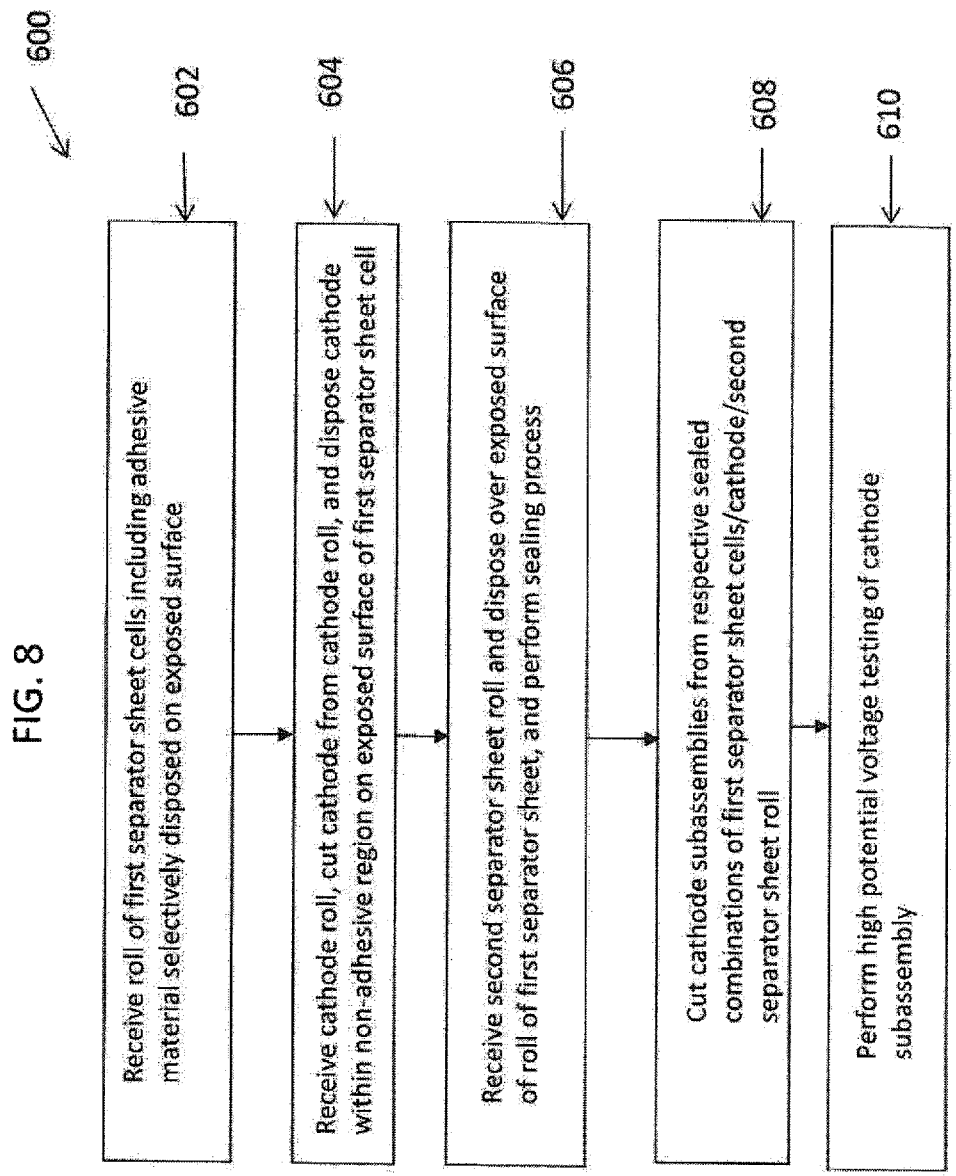
FIG. 8 is a flowchart of a process for manufacturing a cathode subassembly according to an embodiment of the present disclosure.

The flowchart of FIG. 8 illustrates a process 600 for manufacturing a cathode subassembly, as described above with reference to FIGS. 2, 3, 4A, 4C, 5, 6 and 7. The process advantageously may repeatedly obtain a peripheral edge of a cathode subassembly, which is formed from aligned peripheral edges 220, 224 of the sheets 204, 206 as described above, within design constraint margins of about +/−0.001 to 0.002 inches. Accordingly, a stacked electrolytic capacitor configuration, which includes the cathode subassemblies of the present disclosure and other components including anodes, cathodes and separator sheets, may be manufactured to have a composite peripheral edge which is within design constraint margins of about +/−0.001 to 0.002 inches. The process 600 may be performed using an automated assembly machine, or alternatively manually.

Referring to FIG. 8, in block 602, a first separator sheet roll 205, such as illustrated in FIGS. 5-6, including a plurality of first separator sheet cells 204a each having the features described above, may be provided, for example, on a conveyor belt of an automated assembly machine. The roll 205 may be provided on the conveyor belt with the surface 268 exposed, including the adhesive material 222 selectively disposed thereon, and the apertures 270 of the respective sheet cells 204a may provide for holding and locating the roll 205 on the conveyor belt.

In block 604, a roll of cathode foil may be supplied to the assembly machine, and then a cathode 202 may be cut therefrom, with a laser or by die cutting as conventional, such that the shape of the outer peripheral edge of the cathode 202 corresponds to the shape of the perimeter 218 of the first region 214. In one embodiment, the cathode may be cut such that the portion of its outer peripheral edge to be disposed in the first region 214 substantially corresponds or is identical in size and shape to line 230 defining the margin assembly region 232, as shown in FIG. 4C. Further in block 604, the cathode 202 may be placed on one of the separator sheet cells 204a within the region 214, such that no portion of the cathode extends beyond the perimeter 218 and, thus, the cathode is not in contact with the adhesive material 222 in the region 264 surrounding the perimeter 218.

In one embodiment, the cathode may be cut to a size and shape such that the cathode fits entirely within the region interior to the assembly margin region 232, as shown in FIG. 7.

In one embodiment, the adhesive material may be colored, for example, with a dye, such that a vision system of the assembly machine may, based on the color of the adhesive material, readily align the cathode with the region 214, and desirably provide that the cathode is placed within the region 214 interior to the assembly margin region 232.

In block 606, a roll of second separator material ("second separator roll"), which is formed only from separator material and does not include adhesive material, may be provided for use in forming the separator sheet 206 of the cathode subassembly. The second separator roll may be fed into the assembly machine and suitably manipulated within the machine such that the second separator roll is placed over the exposed surface of the first separator roll 205 containing cathodes placed respectively within regions 214 of the sheet cells 204a. The second separator roll may then be pressed against the roll 205 with the cathodes thereon to activate pressure activated adhesive material 222 on the roll 205. By activating the adhesive material, a seal may be created between surface portions of the separator sheet cells 204a at which the adhesive material is disposed and portions of the second separator roll overlying the adhesive material on the sheet cells 204a. For each sheet cell 204a, a cathode is within the region 214 and is sealed between the sheet cell 204a and the overlying portion of the sheet 206 except at the edge portion 260c' of the sheet cell 204a.

In block 608, cutting may be performed through each of the sheet cell 204a/cathode/second separator roll combinations as sealed in block 606, by use of a laser, die, mechanical shearing, cleaving or the like, to obtain individual cathode subassemblies 200 having an outer periphery which is sealed except at the portion of the periphery of the subassembly 200 corresponding to the cathode tail 228 that extends out from the sheets 204, 206, as shown in FIG. 2. Referring to FIG. 3, the sealed portion of the outer periphery of the cathode subassembly 200 may be formed by edges 220 and 224 aligned with each other, except at the edge portions 220a, 224a. As discussed above, the cathode tail 228 is disposed in the region 274 and extends away from the sheets 204, 206 at the aligned edge portions 220a, 224a. At other than the portions 220a, 224a, the edges 220, 224 may be spaced at least about 0.020 inches from the perimeter 218 by the sealing region 208 of the cathode subassembly, which extends from the perimeter 218 to the edges 220 and 224.

In block 610, each cathode subassembly as obtained in block 608 may be individually tested to insure a satisfactory seal in the sealing region. For example, the testing may be performed by disposing the cathode subassembly between two conductive plates under pressure and applying a predetermined high potential voltage ("withstand voltage") to insure that there is no arcing or other defect noticed. For example, a withstand voltage of 600 volts may be applied during testing of the subassembly to insure that the subassembly may operate without failure when included as part of a stacked electrolytic capacitor configuration in a capacitor having a 450 Volt working voltage specification.

The testing of the individual cathode subassemblies following their manufacture may advantageously improve yield and reduce waste of resources in the manufacture of stacked electrolytic capacitor configurations which include the cathode subassemblies. In particular, testing only the cathode subassembly before the subassembly is assembled into a stack with other components may avoid the need to discard the entirety of the components of the stack, such as when a cathode subassembly in the stack has a defect and causes the entire completed stack to fail testing following manufacture of the stack. Thus, based on the testing of the individual cathode assemblies before they are included in a stack, a high degree of certainty may be obtained that the manufactured stack will perform satisfactorily as an electrolytic capacitor.

Further, the substantially sealed, integrated structure of the cathode subassembly completely or almost completely eliminates the possibility of line of sight arc discharge or contact between anodes, and the cathodes within cathode subassemblies, in a completely manufactured stacked electrolytic capacitor configuration, because the cathodes, except for the cathode tail, are disposed within an enclosure or pocket formed by the first and second separator sheets. The pocket in which the cathode in the cathode subassembly is disposed avoids the need to manufacture a stacked electrolytic capacitor configuration in accordance with a design constraint requiring offset of cathodes from adjacent anodes, because the sheets forming the integral subassembly serve as an insulative barrier between edge portions of anode plates in the stack and the cathodes in the adjacent cathode subassemblies, thereby substantially or completely eliminating the potential of contact or line of sight arc discharge therebetween.

In addition, the portion of the sheet 204 at region 274 and the overlying portion of the sheet 206, which form an extended sheet portion of the subassembly 200, are configured to avoid line of sight arc discharge and contact between edge portions of an anode plate in a stack and exposed portions of cathode tails which extend away from the edge portions 220a, 224a of the cathode subassemblies included in the stack with the anode plate. Thus, design requirements for offset of a cathode from an anode, such as the peripheral edge of the cathode being retracted by a predetermined amount from the peripheral edge of an overlying or underlying separator sheet and an anode in a stack, and a minimum line of sight barrier for a stack, such as 0.070 inches for a line of sight barrier from a cathode peripheral edge to an anode peripheral edge, may be eliminated or relaxed, by providing cathodes in the stack which are integrated within cathode subassemblies in accordance with the present disclosure.

Advantageously, according to the present disclosure, a single integrated assembly of the cathode and a separator may be obtained in the form a cathode subassembly, in which the cathode is sealed therein by the two separator sheets and adhesive material as described above, which includes an electrolyte permeable physical barrier to access surfaces of the cathode, which has a substantially uniform thickness and a thickness not exceeding the combined thickness of the cathode and the two separator sheets, which includes alignment regions at the peripheral edge to ease manufacture in a stacked electrolytic capacitor configuration with other components included in the stack, and in which the cathode is sufficiently sealed by the separator sheets and adhesive combination to electrically support a design voltage operation for the cathode, such as when included in an electrolytic capacitor.

Figure 9:
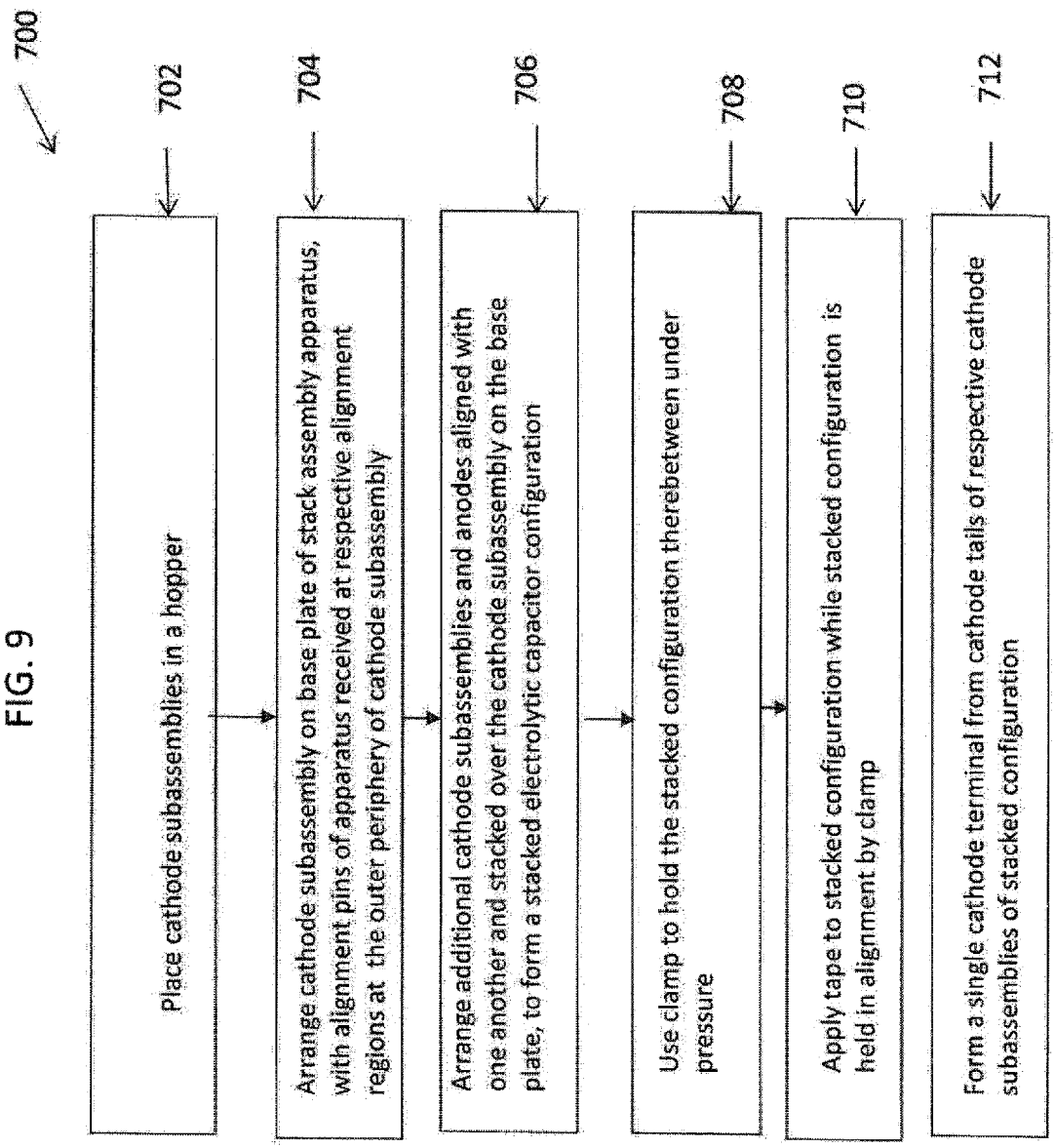
FIG. 9 is a flowchart of a process for manufacturing a stacked electrolytic capacitor configuration including a cathode subassembly according to an embodiment of the present disclosure.

The flowchart of FIG. 9 illustrates a process 700 for manufacturing a stacked electrolytic capacitor configuration including one or more cathode subassemblies of the present disclosure, such as manufactured according to the process 600, in accordance with an embodiment of the present disclosure.

Figure 10:
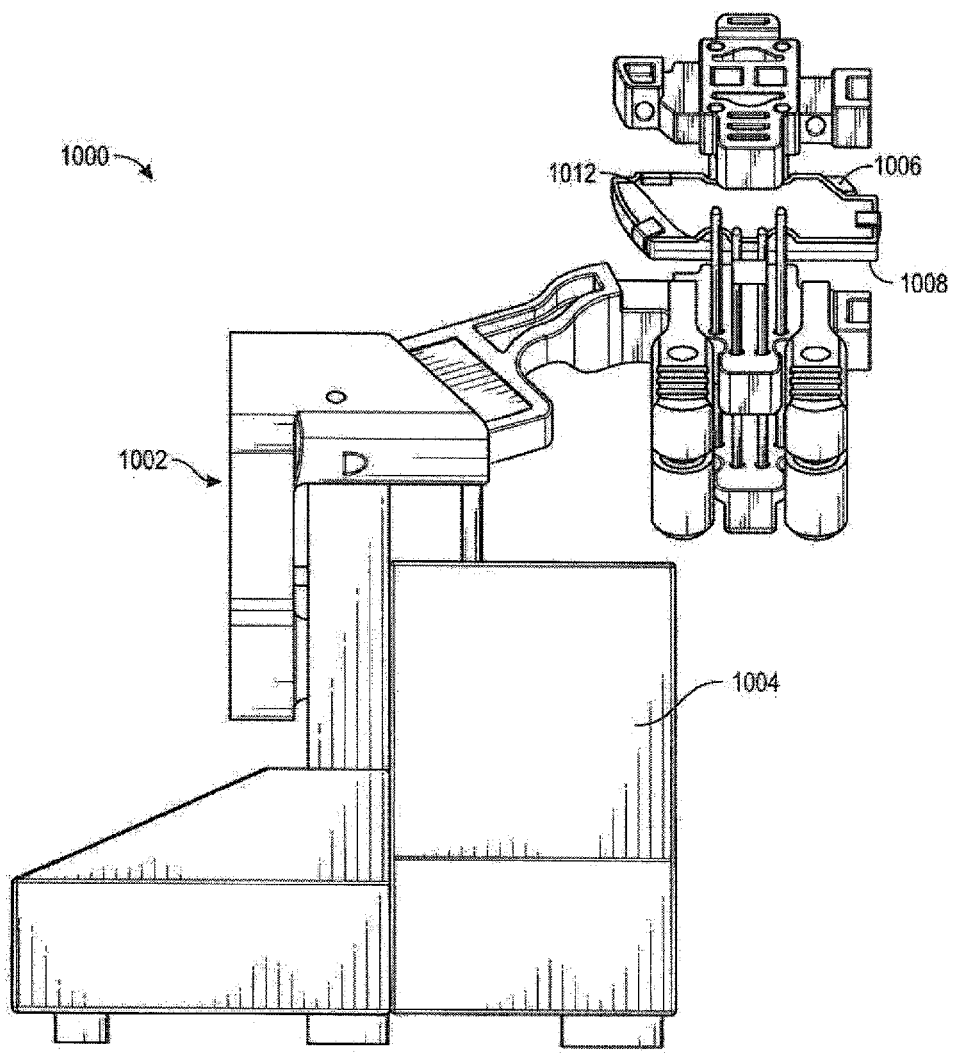
FIG. 10 is a perspective, partially exploded view of an apparatus for manufacturing a stacked electrolytic capacitor configuration including a cathode subassembly according to an embodiment of the present disclosure.
Figure 11A:
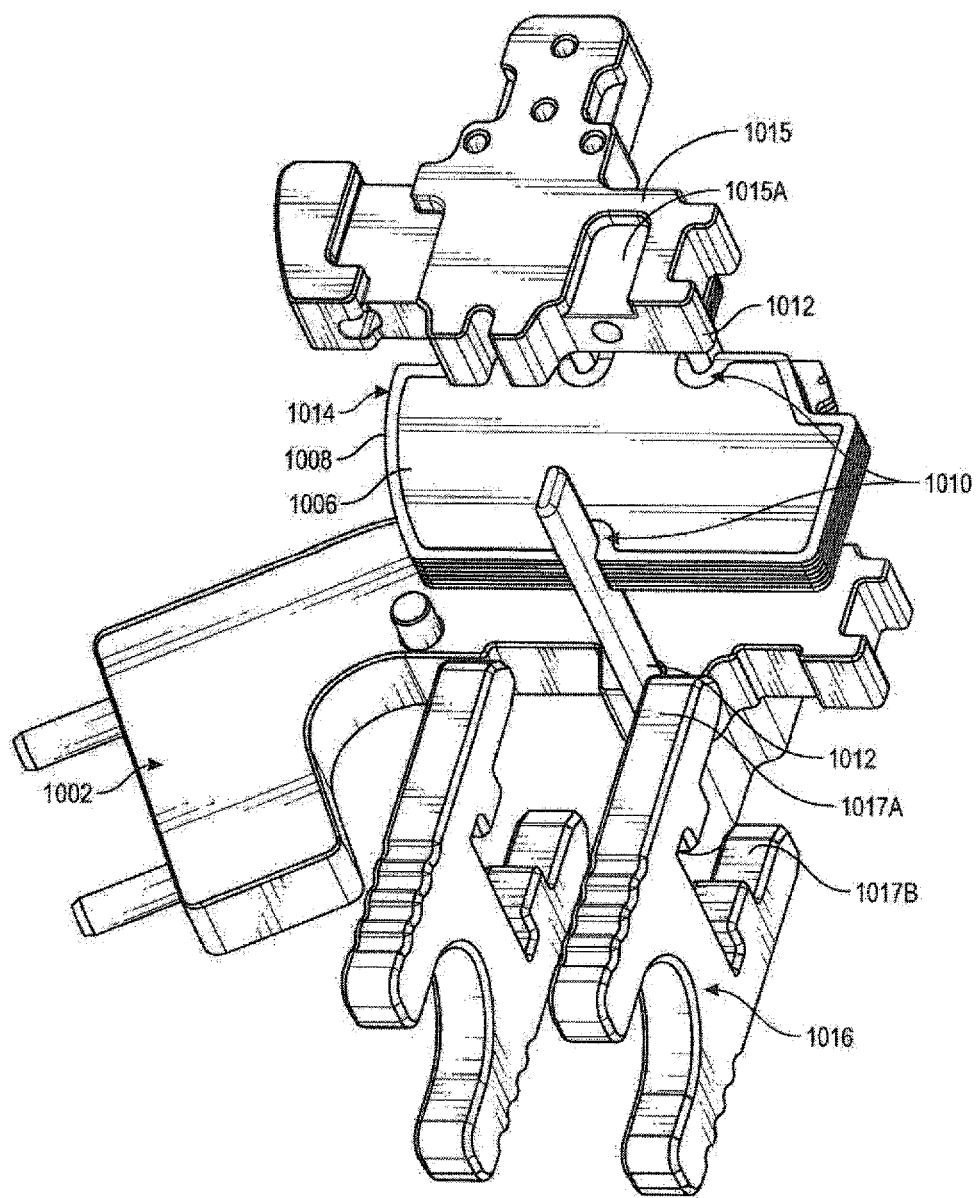
FIG. 11A is an exploded, perspective view of a portion of the apparatus of FIG. 10.
Figure 11B:
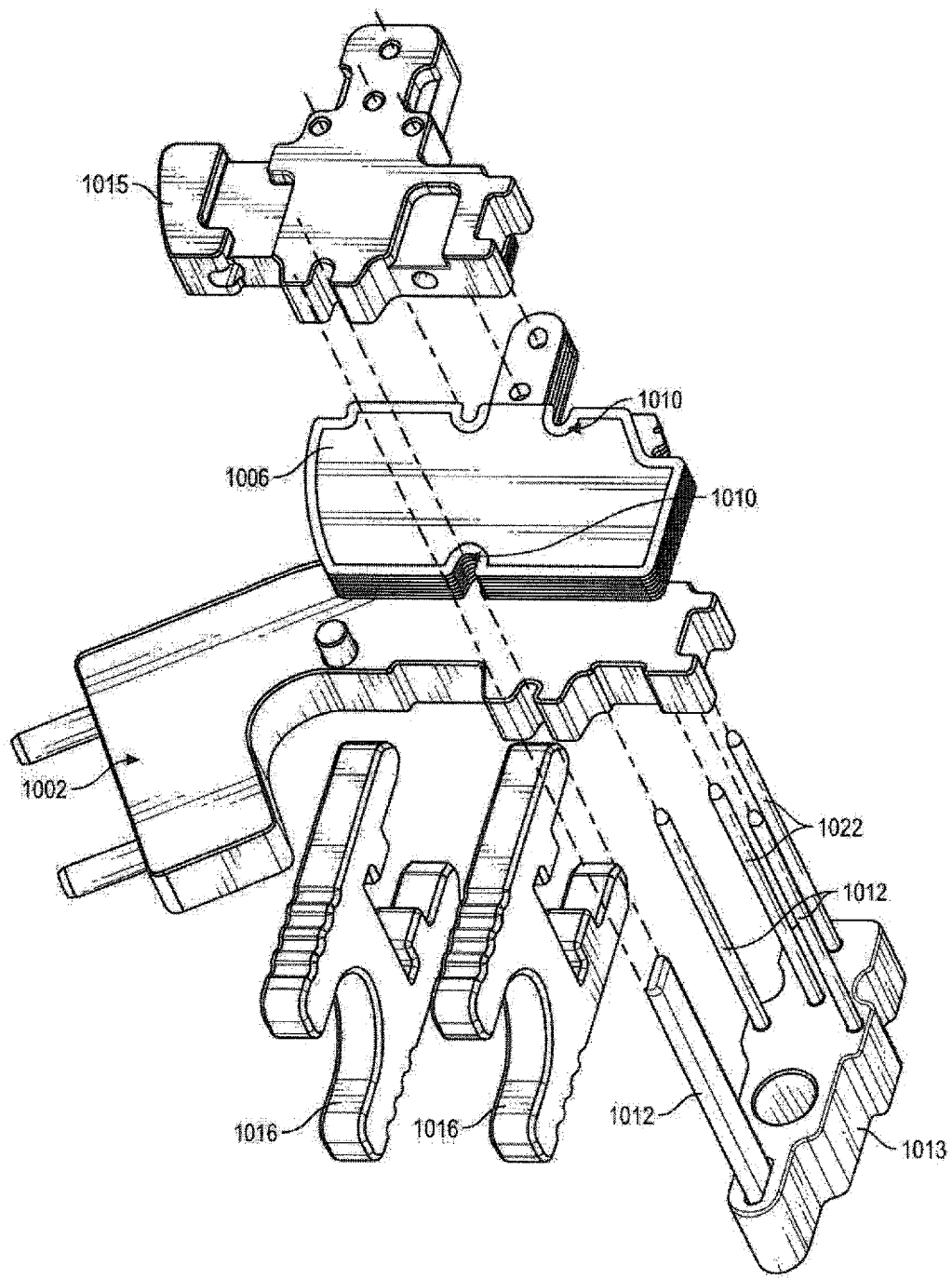
FIG. 11B is another exploded, perspective view of a portion of the apparatus of FIG. 10.

The process 700 may be performed, for example, using a stack assembly apparatus 1000 as illustrated in FIGS. 10, 11A and 11B. Referring to FIGS. 10, 11A and 11B, the stack assembly apparatus 1000 may include an arm 1002 interconnecting a support base 1004 and a stacking fixture or base plate 1006. The base plate 1006 may have a peripheral edge 1008 including recesses 1010 configured to receive alignment elements or pins 1012 that extend from an alignment block 1013, which is at a bottom surface of the base plate, to above a surface 1014 of the base plate. The alignment block 1013 may further include cathode tail alignment pins 1022, which extend above the surface 1014 of the base plate. The alignment elements or pins 1012 may be configured such that an external surface portion thereof facing an interior region of the base plate 1006 has a shape corresponding to the shape of alignment regions at the peripheral edge of the cathode subassembly, as well as alignment regions of other components to be included in a stack with the cathode subassembly. The pins 1012 may be positioned to contact respectively corresponding alignment regions of the cathode subassembly, and also respective alignment regions of other components that may be included in the stack. In addition, the pins 1022 may be configured and positioned to extend through apertures 229 of the cathode tail of the subassembly 200 when the subassembly 200 is included in a stack formed on the base plate 1006.

Referring to FIG. 9, in block 702, cathode subassemblies, such as those that pass the testing of block 610 as described above, may be placed in a hopper for assembly into a stack using the apparatus 1000, or alternatively for use in a manual process of stack assembly.

In block 704, a cathode subassembly from the hopper may be disposed on the base plate 1006 of the stack assembly apparatus 1000, such as by operation of a robotic assembly device. In particular, the cathode subassembly may be arranged on the base plate 1006 such that the alignment regions are respectively aligned with corresponding alignment elements 1012 which contact the peripheral edge of the cathode subassembly at the portions thereof including the alignment regions. The alignment elements 1012 may provide for precise self-alignment of the peripheral edge of a cathode subassembly with the peripheral edge of other cathode subassemblies and also the peripheral edges of anode plates, such as when each of such components is placed one over the other to form a stack. In addition, the apertures 229 in the cathode tails may receive the alignment pins 1022 therethrough, which may further provide for self-alignment of the subassemblies 200 in the stack.

In block 706, an electrode stack may be created by adding one or more anodes, cathodes, separator sheets and cathode subassemblies one over the other, such as on top of a cathode initially disposed directly on the surface 1014 of the base plate 1006. The stack may include any number of anodes, in any desired arrangement with the respect to the cathode subassemblies. In one embodiment, the anode may be an etched foil having an outer periphery with the same configuration as the peripheral edge of the cathode subassembly. The alignment regions of the cathode subassemblies, and similar and corresponding alignment regions that may be provided at the peripheral edge of an anode, may provide for self-alignment of the components included in a stack. Further, based on the creation of a stack including the cathode subassemblies together with multiple anodes aligned with one another by the alignment regions, peripheral edge tolerances for the stack may be about +/−0.001 to 0.002 inches. With such tolerances in the manufacture of a stack according to the present disclosure, a high packaging efficiency may be obtained for anodes included in the stack, because an anode having an increased functional surface area may be placed within the same volume of a stack.

In one embodiment, the permanent seal in the sealing region at the peripheral edge of the cathode subassembly may permit the line of sight design constraint at the peripheral edge of a stacked electrolytic configuration including the cathode subassembly to be reduced by more than 50% relative to the line of sight design constraint for the peripheral edge of a stack containing individual cathodes whose respective edges are not surrounded by sealed sheet material as in the present disclosure.

Referring again to FIG. 9, in block 708, after a desired stack of anodes and cathode subassemblies in alignment with one another at their respective peripheral edges is formed in block 706, one or more clamps 1016 may be used to hold the stack together and avoid the components of the stack from becoming misaligned before the stack is placed, for example, in the case of a battery. The clamp 1016 may include a top clamping surface 1017A and a bottom clamping surface 1017B. The surface 1017B may be positioned at the bottom surface of the base plate, and the tamp 1015 may then be positioned on top of the stack with the surface 1017A positioned in a recess 1015A of the tamp 1015, such that the stack is held fixed in position between the tamp 1015 and the surface 1014 of the base plate and the components of the stack are not permitted to move and become misaligned with other components in the stack. The use of multiple clamps 1016 advantageously allows uniform pressure to be applied to the stack at multiple points to insure equal compression within the stack, which also improves packaging efficiency for the stack.

In block 710, tape or an external boot may be applied to maintain the aligned arrangement of the elements of the stack while the stack is held fixed by the clamps 1016 under pressure. Then, the clamps may be suitably removed and a stacked electrolytic capacitor configuration, with the alignment of cathode subassemblies and anodes maintained by the tape, may undergo further manufacturing processing.

Figure 12A:
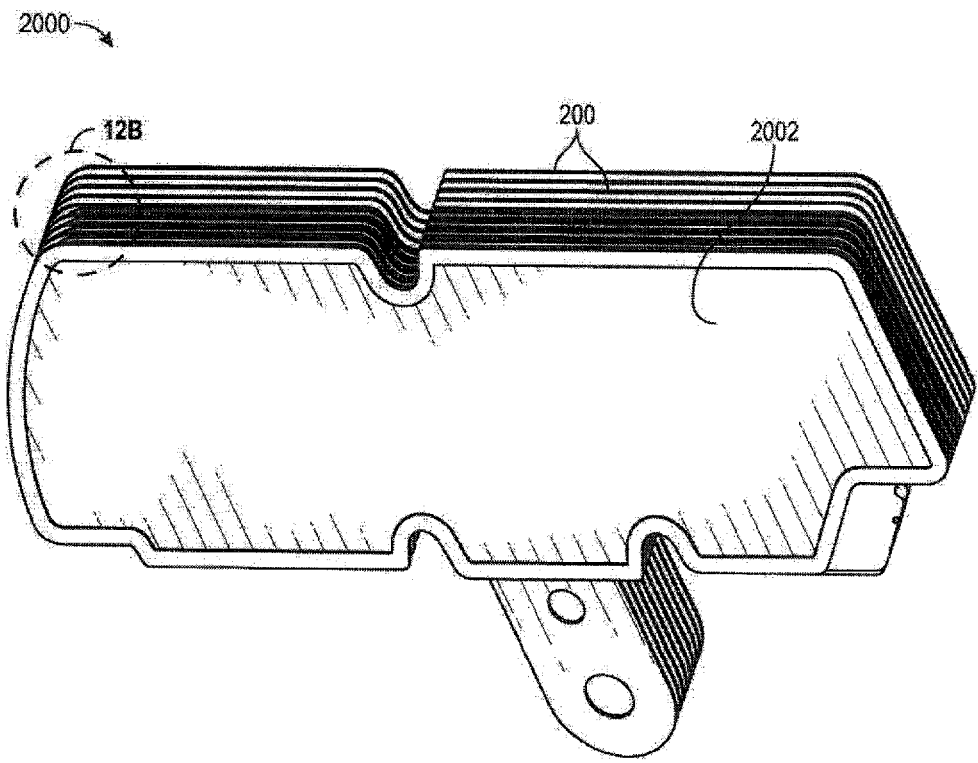
FIG. 12A is a perspective view of a stacked electrolytic capacitor configuration including cathode subassemblies, anodes, cathodes and separator sheets according to an embodiment of the present disclosure.
Figure 12B:
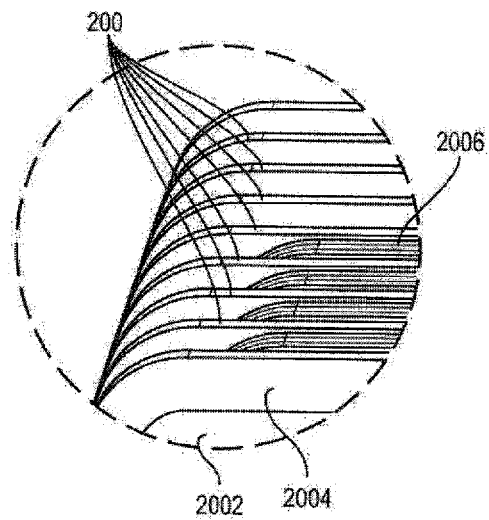
FIG. 12B is an enlarged view of a portion 12B of the stacked electrolytic capacitor configuration of FIG. 12A.

In one embodiment, referring to FIGS. 12A and 12B, an electrolytic capacitor configuration or stack 2000 obtained in block 710 may include a cathode 2002 at each of the top and bottom of the stack 2000, a separator sheet 2004 adjacent an interior surface of each of the top and bottom cathodes 2002 in the stack, and several sets of multiple anodes 2006 and several cathode subassemblies 200. The sets of anodes may be between a cathode 2002 and cathode subassembly 200, or between adjacent cathode assemblies 200. Each component in the stack may have alignment regions at the outermost peripheral edge thereof having the same shape and size as the alignment regions of the cathode subassembly to provide for self-alignment of all components in the stack.

Figure 13A:
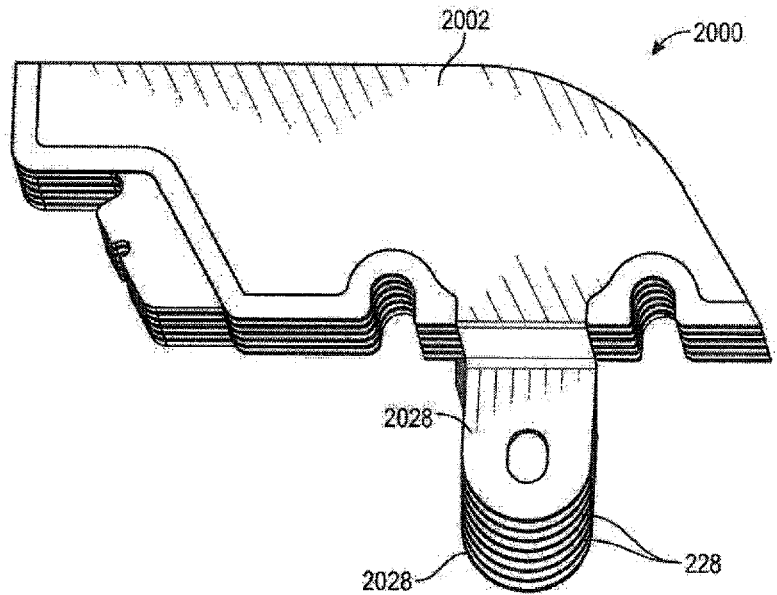
FIG. 13A is a perspective view of a stacked electrolytic capacitor configuration including cathode subassemblies, anodes, cathodes and separator sheets, at a step of manufacture according to an embodiment of the present disclosure.
Figure 13B:
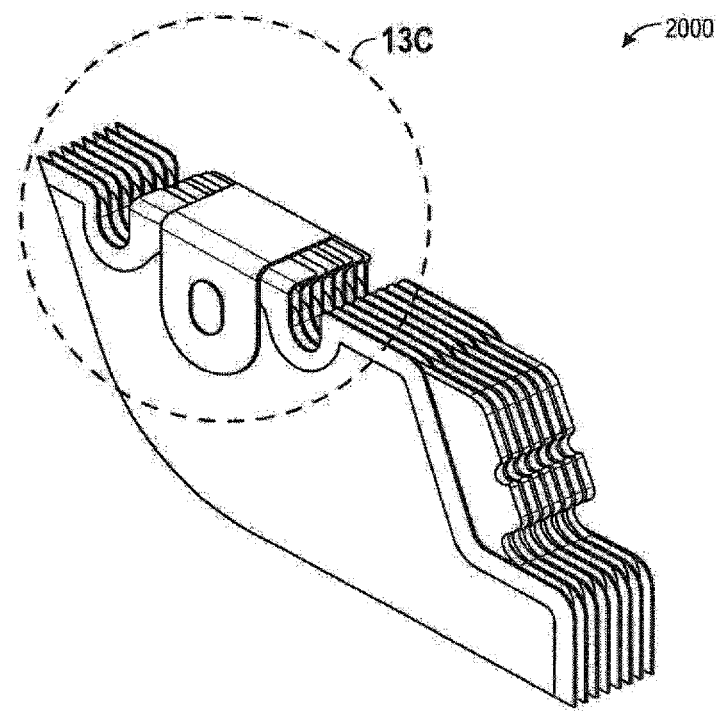
FIG. 13B is a perspective view of the stacked electrolytic capacitor configuration of 13A at another step of manufacture according to an embodiment of the present disclosure.
Figure 13C:
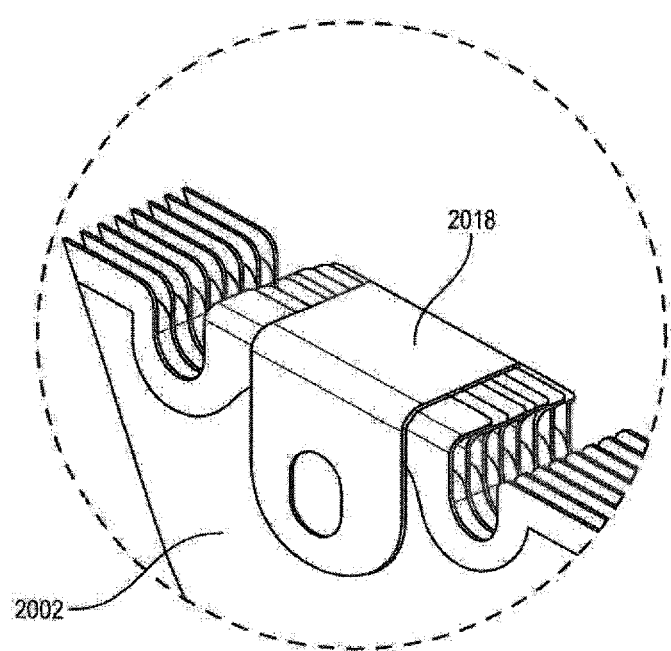
FIG. 13C is an enlarged view of a portion of the stacked electrolytic capacitor configuration of FIG. 13B.
Figure 14A:
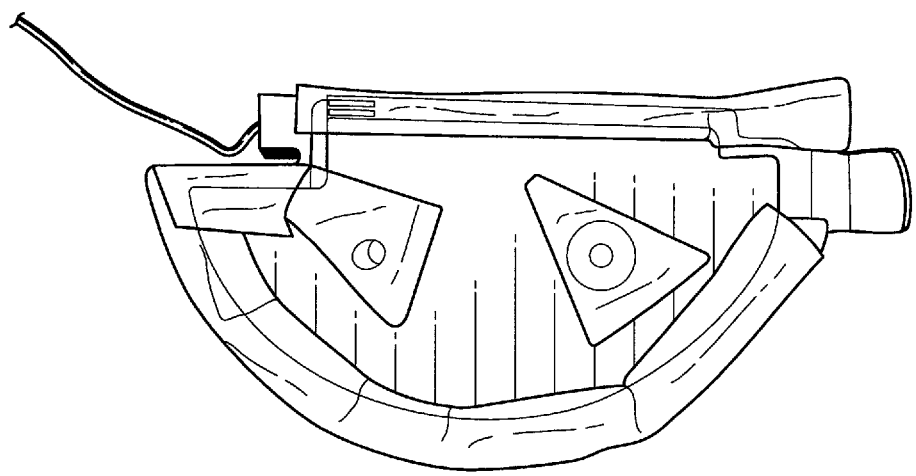
FIG. 14A is a top perspective view of a D-shaped stacked electrolytic capacitor that has been manually taped with an insulating tape along the edges thereof.
Figure 14B:
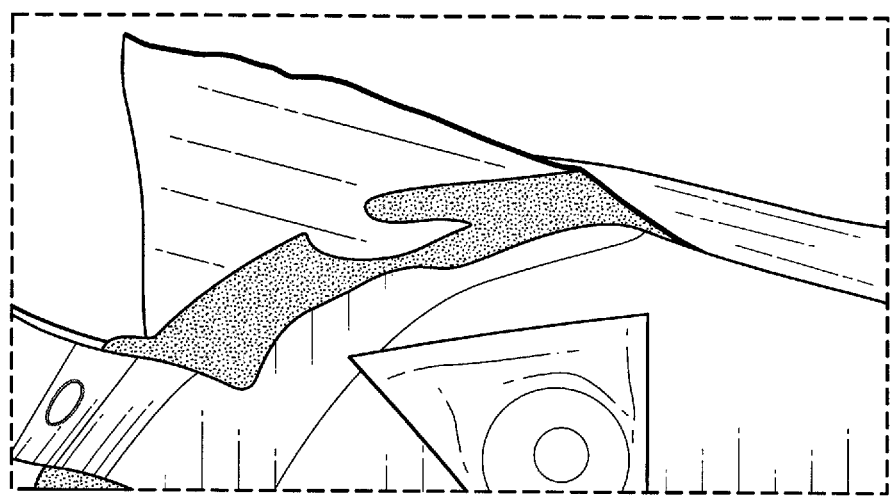
FIG. 14B is an enlarged view of a portion of the stacked electrolytic capacitor of FIG. 14A in which the insulating tape has been pulled away for adjustment and has damaged the capacitor.
Figure 15A:
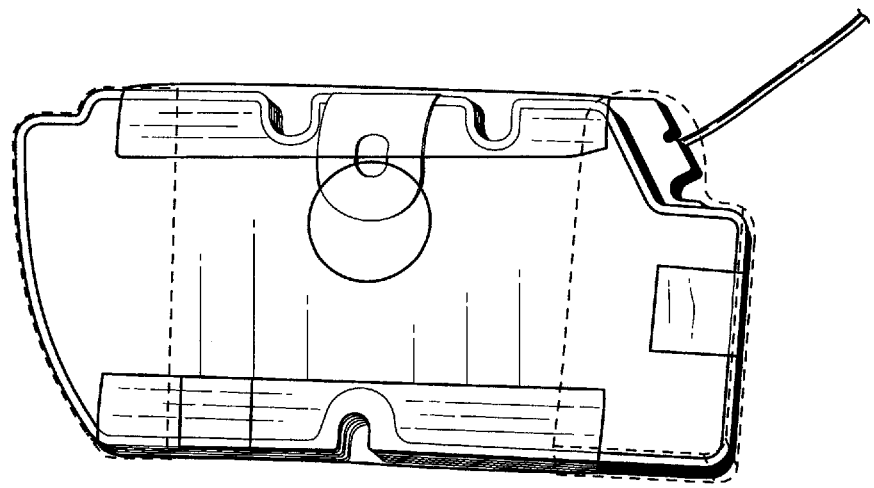
FIG. 15A is a top perspective view of a rectangular stacked electrolytic capacitor that has been fitted with custom manufactured plastic boots on the ends thereof, and manually taped with an insulating tape along the edges of the stack between the boots.
Figure 15B:
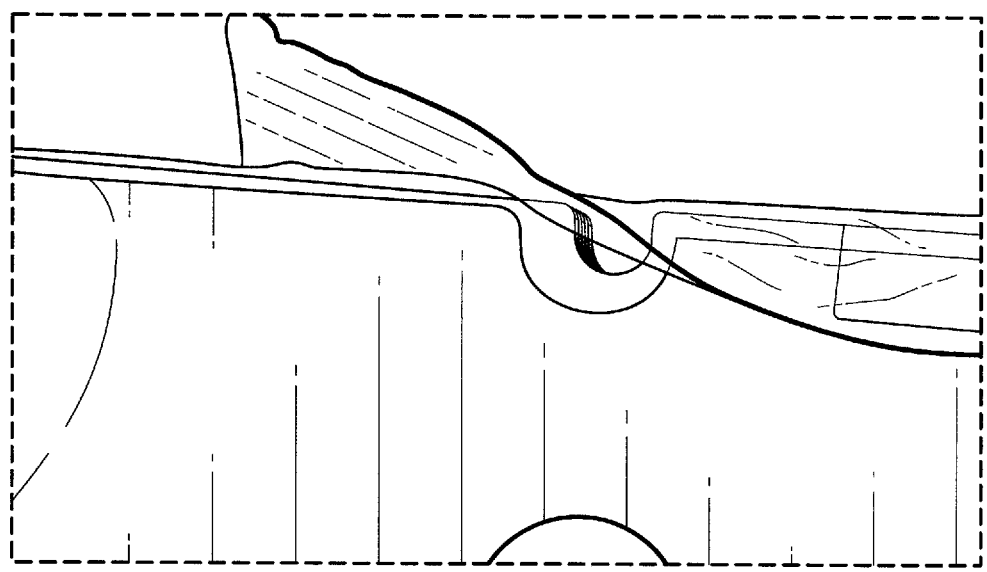
FIG. 15B is an enlarged view of a portion of the stacked electrolytic capacitor of FIG. 15A in which the insulating tape has been pulled away for adjustment and has damaged the capacitor.

Referring to FIGS. 13A, 13B and 13C, in further steps of the manufacture of a stacked electrolytic capacitor configuration according to the present disclosure, a stack, such as the stack 2000 of FIGS. 12A and 12B, may, by automatic or manual means, be configured to fit into a battery device by joining cathode tails 2028 of the cathodes 2002 and cathode tails 228 of the subassemblies 200 to one another. Referring to FIG. 9, in block 712, a single cathode terminal 2018 may be formed from the cathode tails 2028 and 228 by compressing the cathode tails together at one end of the stack and then bending the cathode tails towards an adjacent peripheral edge of the stack 2000 and into contact with the cathode 2002 at the other end of the stack, and then welding the cathode tails of the stack 2000 together. When the cathode tails are being compressed together at one end of the stack, and when the cathode tails are in an assembled positioned, welded together and extending along the peripheral edge of the stack to form the terminal 2018, the portion of the sheets 204, 206 of the subassemblies 200 at the region 274 may provide a barrier that avoids contact, and maintains a minimum line of sight, between edges of the anodes 2006 and the exposed surfaces of the cathode tails, so as to avoid arc discharge or shorting between the former and latter. The region 274, as discussed above, may be configured to have a size and shape such that the extended separator sheet portion of each of the cathode subassemblies in a stack create a line of sight and contact barrier in view of the expected bending of the cathode tails during the manufacture of a stack. After the cathode tails are welded together, the stack may be placed into a capacitor housing.

It is to be understood that these embodiments of capacitors disclosed herein are merely illustrative of the principles and applications of the present disclosure. For example, another cathode subassembly configuration that may be used with separators described herein can be found in U.S. application Ser. No. 14/882,782, the disclosure of which is incorporated herein by reference.

As noted above, during the formation of anodes for stacked capacitor or battery configurations, the anodes are punched to the proper shape for the capacitor/battery case. This punching process can result in the edges of the anodes containing burrs and attached particles. These particles can penetrate and/or tear the Kraft paper or other conventional materials forming separator sheets 204 and 206, or separator 106, causing a short and compromising the quality and life of the capacitor/battery. To address this potential problem, another aspect of the present disclosure provides an improved material for forming separator sheets 204 and 206, or separator 106. This aspect is described below with reference to separator 106, but is also applicable to separator sheets 204 and 206.

Spacer (or separator) 106 can include a pulp composition. The pulp composition includes a nanocellulose material. The nanocellulose material may have a high hemicellulose content and/or a high aspect ratio. The hemicellulose content may be about 40 wt % or greater, based on the total weight of the nanocellulose material, or between about 40 wt % and about 50 wt %, or between about 40 wt % and about 45 wt %. The nanocellulose material can include particles or fibers having an aspect ratio of at least about 250, between about 250 and about 10,000, between about 250 and about 5,000, or between about 250 and about 1,000. In some embodiments, the aspect ratio ranges from about 300 to about 900.

Nanocellulose crystals may have diameters between about 5 nanometers (nm) and about 50 nm. Nanocellulose fibers may have diameters between about 10 nm and about 520 nm. By way of comparison, a conventional cellulose material, such as that found in a pulp used to produce a Kraft paper, may have a diameter between about 10 micrometers (μm) and about 20 μm, a length between about 1000 μm and about 3,000 μm, and an aspect ratio between about 50 and about 300. The hemicellulose content in a conventional cellulose material may be between about 10 wt % and about 35 wt %, based on the total weight of the conventional cellulose material.

The nanocellulose material can be derived from an arid grass species, such as an Australian air desert grass known as Spinifex. A detailed description of nanocellulose material made from Spinifex is described in WO 2015/074120. Other sources of nanocellulose material are possible, provided those sources can produce a nanocellulose material having the hemicellulose content and/or aspect ratio described herein. Such other sources may include, for example, coconut husks, cotton, tunicates, algae, bacteria, hemp, jute, rice husks, and/or flax.

The nanocellulose material is a stronger material than conventional pulp materials used in electrolytic capacitors, such as Kraft paper. For example, the nanocellulose materials, being smaller in diameter than conventional cellulose materials but having a high aspect ratio, can be packed more densely and have higher surface area for interlocking along their length Interlocking may refer to physical or electrostatic binding along the length of the material. The difference in the strength of the nanocellulose material as compared to a conventional cellulose material is akin to the difference in strength of textile yarns spun from raw fibers possessing relatively higher different aspect ratios; for example yarns spun from conventional cotton vs. Egyptian cotton, where the higher aspect ratio of the latter's fibers results in a more robust material, all else being equal.

The pulp composition can include other pulp materials, such that the pulp composition is a blend of the nanocellulose material and other pulp materials. The other pulp materials can include conventional pulp materials, such as, for example, Kraft paper. The weight percentage of the nanocellulose material to the other pulp materials may be up to 100 wt % nanocellulose material; preferably, between about 10 wt % and about 70 wt % nanocellulose material; and, more preferably, between about 20 wt % and about 50 wt % nanocellulose material. The blended material may be utilized to reduce the manufacturing costs of the spacer 106. A spacer comprising a blend may have a thickness of between about 5 µm and about 20 µm depending on the composition of the blend and the strength required of the spacer 106. A blend that includes a higher weight ratio of the nanocellulose material may result in a spacer having a thickness towards the lower end of the range. A spacer 106 that is made essentially of nanocellulose material may be as low as about 5 microns thick owing to the improved strength resulting from the nanocellulose material.

Spacer 106 can further include other materials that are blended with the pulp material. Such other materials may include woven textiles made of one or a composite of several nonconductive fibers such as aramid, polyolefin, polyamide, polytetrafluoroethylene, polypropylene, and glass. The weight percentage of these other materials may be between about 10 wt % and about 50 wt % based on the combined weight of the pulp material and the other materials.

Spacer 106 can be made with suitable combinations of nanocellulose material and other paper pulp materials/other materials provided the resulting spacer has suitable voltage and effective series resistance (ESR) properties. A suitable spacer may withstand a voltage above about 650 Volts for a capacitor used at about 450 Volt nominal. ESR properties can become relevant in higher density separators, such as the separators disclosed herein, which can have densities ranging from about 1.0 g/cm$^3$ to about 1.2 g/cm$^3$. Further, since nanocellulose materials can be more hydrophobic than other paper pulp materials, conventional electrolytes, such as ethylene glycol, known to bond strongly with conventional paper pulp materials, may be ill-suited for nanocellulose materials. Accordingly, an electrolyte mix that better bonds with nanocellulose materials may be required. For example, an electrolyte mix that includes electrolytes that are higher density and/or that have more hydrophobic properties may be more suited for use with nanocellulose materials. An electrolyte suitable for use with a nanocellulose separator is gamma butyrolactone.

Spacer 106 should be porous enough that the electrolyte can penetrate therethrough. Spacer 106 preferably shows no dissolution or shrinkage when introduced to the electrolyte. Similarly, when introduced to the electrolyte, spacer 106 preferably does not elute any chemicals (e.g., corrosives or, in the case of aluminum electrolytic capacitors, halides) that would damage any part of a battery device over time, including the cathode subassembly.

Spacer 106 may be made by methods known in the art. For example, a non-woven nanocellulose material can be manufactured to a thickness between about 30 microns and about 40 microns, with a density between about 0.6 g/cm$^3$ and about 0.8 g/cm$^3$. The material can then be calendered down to a thickness between about 5 microns and about 20 microns and a density between about 1.0 g/cm$^3$ and about 1.2 g/cm$^3$.

Once the cathode tails 2028 of the stack 2000 are bent and welded as described above with respect to block 712 of the manufacturing process depicted in the flowchart of FIG. 9, portions of the stack 2000 need to be insulated to avoid shorting with the capacitor housing. Typically, central portions of the top and bottom surfaces of the stack will make electrical contact with the capacitor housing, but the edges of the stack are insulated from the capacitor housing. To facilitate insulating the edges of the stack, a continuous film can be used to seal the edges.

The continuous film may be made of electrically insulating materials that shrink when heat is applied, or electrically insulating materials that are elastic. The insulating materials typically have a low free halide content. Free halides can be corrosive to capacitor components and result in failure of the capacitor. Exemplary thermally shrinkable materials include Kynar®, Kapton®, polyetheretherketone (PEEK), or other shrinkable insulating materials. The temperature necessary to shrink the material is about 240 degrees Celsius or less. In some embodiments, the temperature is about 210 degrees Celsius or less. The temperature may be selected to prevent damage to the separator material. The heat to shrink the material can be provided by conduction, convection, or radiation. For example, conduction or convection heating can be performed in an oven or similar device. Radiation heating can be provided by a light source, such as a laser or another device that emits photons. For example, the shrinkable materials can absorb photons in the infrared spectrum or other wavelength ranges causing the temperature of the materials to increase. Exemplary elastic insulating materials include silicone, fluoropolymers, polysulfides, and nitrile based polymers. The exemplary elastic insulating materials provided are not limited thereto, and any elastic insulating material can be used provided it has the electrically insulating properties necessary to insulate the capacitor stack, mechanical properties to hold a capacitor stack together, and chemical properties that are compatible with aluminum capacitor stacks.

Among the differences between a continuous film and an adhesive tape as shown in FIGS. 14A-B and 15A-B is that the continuous film does not include an adhesive that would cause it to stick to the capacitor stack. When applied, the continuous film conforms to the shape of the stack and holds it in place. Advantageously, it is possible to replace the continuous film without damaging the stack, unlike when an adhesive tape is used.

FIGS. 16-19 as discussed below illustrate several capacitor stacks in which adhesive tape is utilized to hold the stack together. The adhesive tape is used and shown in these figures to temporarily hold the stack in alignment as the continuous film is applied to the stack, and may or may not be present on the capacitor stacks during the manufacturing process. For manufacturing, the stacks could be held on an apparatus to maintain the alignment of the components in the stack while the continuous film is applied. In such an embodiment, the tape can be absent. In another embodiment of a manufacturing process, the tape could be used to hold the stack together while the continuous material is applied as shown in FIGS. 16-19.

Figure 16A:
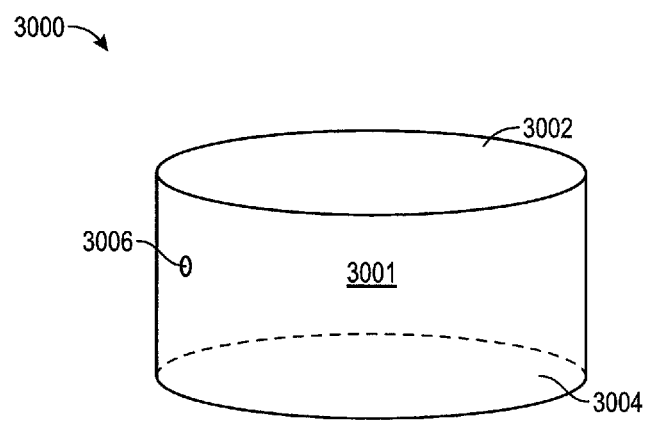
FIG. 16A is a perspective view of a continuous shrinkable film according to an embodiment of the present disclosure.

FIG. 16A depicts one embodiment of a continuous shrinkable film 3000. The film 3000 defines a plenum 3001 with a first opening 3002 and a second opening 3004. The first and second openings 3002, 3004 are located at opposing ends of the plenum 3001 to form a continuous passage through the film. An aperture 3006 through the film 3000 is used to accommodate a wire that connects a terminal of the capacitor to a power source, such as a battery. Such a wire is illustrated in the capacitor stack depicted in FIG. 16B.

Figure 16B:
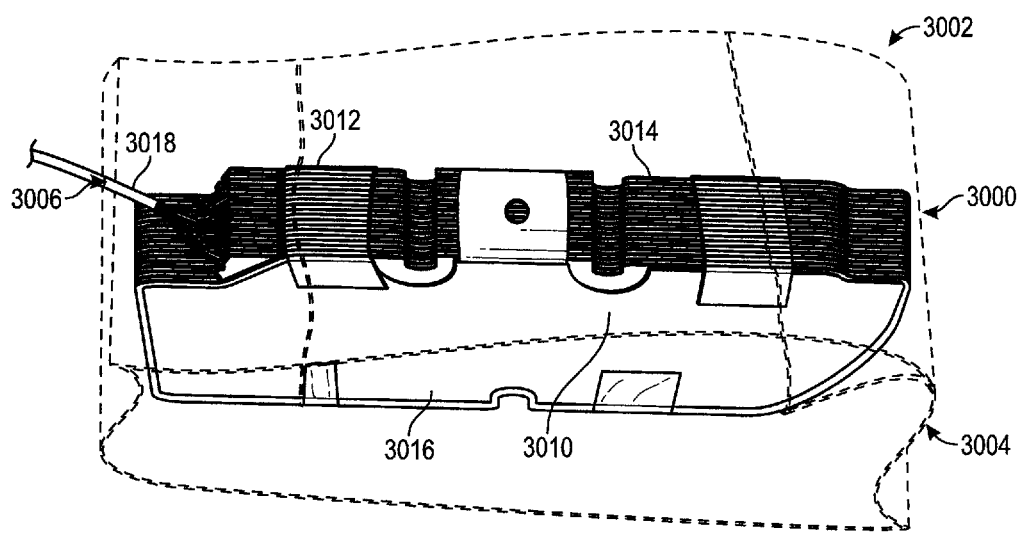
FIG. 16B is a perspective view of a rectangular stacked electrolytic capacitor with a continuous shrinkable film arranged around the edges of the capacitor.

FIG. 16B depicts an embodiment in which the continuous shrinkable film 3000 is arranged around a capacitor stack 3010. The capacitor stack 3010 has an edge 3012, a top surface 3014, a bottom surface 3016, and a wire 3018 protruding from the edge. The wire 3018 is connected to the conductive anodes of the stack 3010. The film 3000 is arranged such that the capacitor stack 3010 is centered in the plenum 3001 with the wire 3018 extending through the aperture 3006 in the film. The top surface 3014 of the stack 3010 faces the opening 3002 at one end of the plenum 3001, while the bottom surface 3016 of the stack faces the opening 3004 at the other end of the plenum. Once arranged as shown, the film 3000 is shrunk such that the edge 3012 and peripheral portions of the top and bottom surfaces 3014, 3016 are covered by the film. The film 3000 is sized such that central portions of the top and bottom surfaces 3014, 3016, which will be electrically coupled to the capacitor housing, are not covered by the shrunken film. Once shrunken around the capacitor stack 3010, the film 3000 holds the layers of the stack in alignment and insulates the anode layers from the capacitor housing.

Figure 16C:
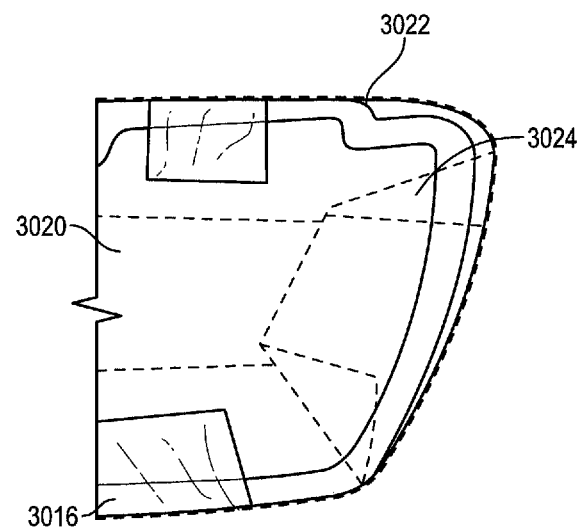
FIG. 16C is an enlarged view of pleated regions in the continuous shrinkable film on a surface of the capacitor of FIG. 16B after shrinking the film.

FIG. 16C depicts an enlarged partial view of the stack 3010 and the film 3000 after the film has been shrunk. The bottom surface 3016 is depicted in FIG. 16C as having a central portion 3020 that is exposed, i.e., not covered by the film 3000. The film 3000 covers a peripheral portion 3022 of the bottom surface 3016. At the corners of the stack 3010 and on the peripheral portion 3022, pleated regions 3024 have formed in the film 3000. The pleated regions 3024 result from portions of the film 3000 folding over each other due to the irregular shape at the corners of the stack. In some embodiments, pleated regions in the film 3000 are permissible provided the pleated regions do not have a thickness that interferes with fitting the stack 3010 in the capacitor housing. The thickness of a pleated region that does not interfere with fitting the stack 3010 in the capacitor housing may be less than or equal to about 3 times the thickness of the material that is being pleated.

Figure 16D:
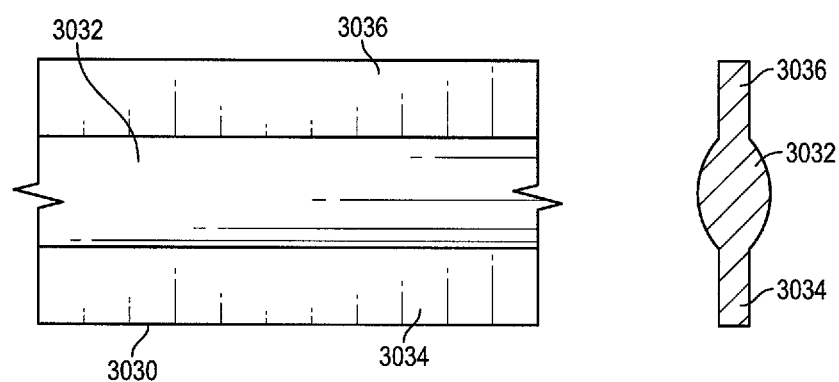
FIG. 16D is a schematic partial view and a cross-sectional view of a continuous shrinkable film having regions of varying thickness.

In an embodiment, the continuous shrinkable film can be designed with a varying thickness such that a thinner portion of the film overlies the peripheral portions of the top and bottom surfaces of the stack to account for pleating regions formed as the film is shrunk. FIG. 16D depicts a schematic partial view and a cross-sectional view of a continuous shrinkable film 3030 having a varying thickness. The film 3030 has a central region 3032 and peripheral regions 3034, 3036 on opposing sides of the central region. The central region 3032 has a greater thickness than the peripheral regions. When the film 3030 is shrunk around a capacitor stack, the peripheral regions 3034, 3036 will overlie peripheral portions of the top and bottom surfaces of the stack and form pleated regions at the corners of the stack. The thickness of the peripheral regions of the film 3030 is selected such that the pleated regions formed will be sufficiently thin so as not to inhibit the stack from fitting in a capacitor housing.

Figure 17A:
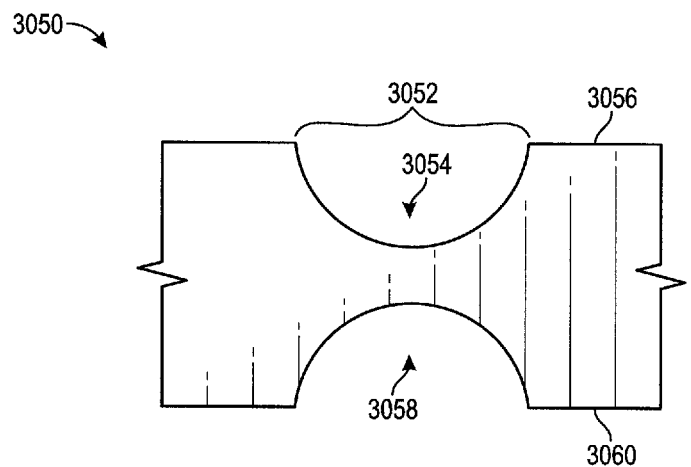
FIG. 17A is a schematic partial view of a continuous shrinkable film having a narrow region to accommodate corners of a stacked electrolytic capacitor upon shrinking the film.
Figure 17B:
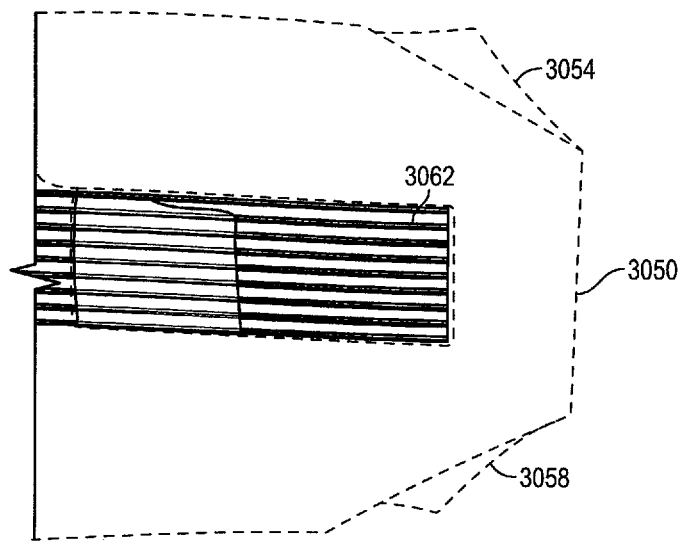
FIG. 17B is a side view of a portion of a stacked electrolytic capacitor in which narrow regions of a continuous shrinkable film are aligned with corners of the capacitor prior to shrinking the film.
Figure 17C:
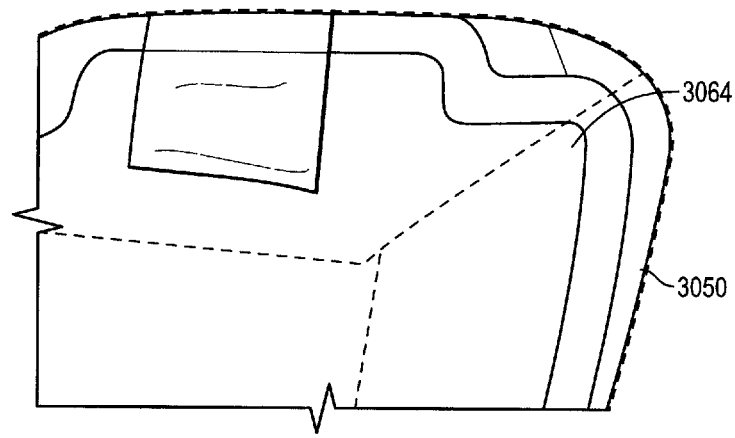
FIG. 17C is an enlarged view of a corner of the capacitor of FIG. 17B after shrinking the film to form a joint at the corner of the capacitor.

In alternative embodiments, the pleated regions can be eliminated by shaping the shrinkable film to account for corners of the stack. FIG. 17A depicts a schematic partial view of a continuous shrinkable film 3050 shaped to eliminate pleated regions. The film 3050 includes a plurality of narrow regions 3052 (only one narrow region is illustrated in FIG. 17A), each of which includes a top recess 3054 which is recessed from a top edge 3056 of the film and a bottom recess 3058 which is recessed from a bottom edge 3060 of the film. The recesses 3054, 3058 are designed to accommodate the top and bottom surfaces of a capacitor stack at its corners. FIG. 17B depicts a partial view of the film 3050 in which the top recess 3054 and the bottom recess 3058 are aligned with a corner of a capacitor stack 3062. As shown in FIG. 17C, upon shrinking the film 3050, the edges of the recess 3054, 3058, respectively, abut each other or slightly overlap to form a joint 3064 at the corner of the stack. Typically, the edges of the recess that form the joint are not melted together.

Figure 18A:
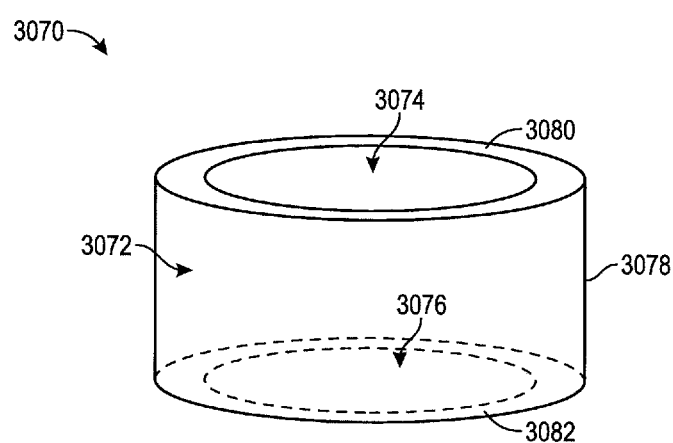
FIG. 18A is a perspective view of another continuous film according to an embodiment of the present disclosure.

In yet another alternative embodiment, joints can be excluded. FIG. 18A depicts a view of a film 3070 in accordance with another embodiment of the disclosure. The film 3070 can be formed of a shrinkable insulating material or an elastic insulating material. The film 3070 defines a plenum 3072 having a top opening 3074 and an opposing bottom opening 3076. The film 3070 includes a central portion 3078, an annular top portion or ring 3080, and an annular bottom portion or ring 3082. The top portion 3080 extends inwardly from one end of the central portion 3078 to define the top opening 3074. The bottom portion 3082 extends inwardly from the opposite end of the central portion 3078 to define the bottom opening 3076. An aperture 3079 through the central portion 3078 of the film 3070 is used to accommodate a wire that connects a terminal of the capacitor to a power source.

The film 3070 can be an off-the-shelf product provided the product has dimensions that are suitable for use with a capacitor stack. Alternatively, the film 3070 can be pre-cast from a mold based on the dimensions of the capacitor stack the film 3070 will be fitted on. In the case of a film 3070 formed of a shrinkable material, a mold of the capacitor stack can be constructed that may exceed the size of the actual capacitor stack. For example, the size of the mold may exceed the size of the actual capacitor stack by about 5 to 10% to allow for the film 3070 to shrink to fit the actual capacitor stack. Various methods can be used to form a shrinkable film on the mold. One method includes dipping the mold into a solution of polymer and/or monomers, and then curing the solution deposited on the mold to form a shrinkable film on the mold. Portions of the film can be removed by cutting or scribing with a blade, laser, or by another means to form the top and bottom openings 3074, 3076, and the aperture 3079 in the film 3070. Alternatively, the surface of the mold can be treated in regions at which the top and bottom openings 3074, 3076 and the aperture 3079 will be located such that the solution does not deposit on those surfaces of the mold. A similar method can be used to make a film of the elastic insulating material, except the mold used in this embodiment will be about 5 to about 10% smaller than the actual capacitor stack. This size of mold is selected because a film 3070 made of elastic insulating material will be stretched to fit over the actual capacitor stack.

Figure 18B:
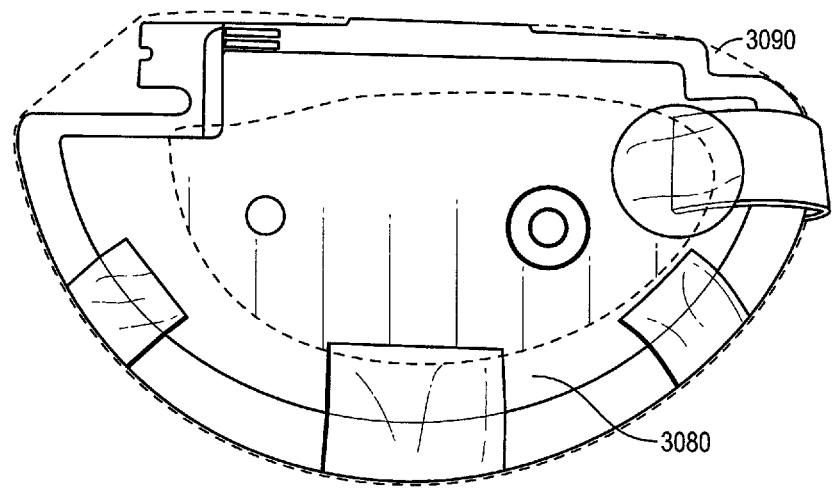
FIG. 18B is a top perspective view of a D-shaped stacked electrolytic capacitor with the continuous film of FIG. 18A applied to the capacitor stack.

FIG. 18B depicts a top perspective view of a D-shaped capacitor stack 3090 in which the film 3070 has been applied to the capacitor stack. The top portion 3080 of the film conforms to the shape of the stack and overlies a peripheral portion of the top surface of the stack. Although not shown, the bottom portion 3082 of the film also conforms to the shape of the stack and overlies a peripheral portion of the bottom surface of the stack. However, the central region of both the top surface of the stack and the bottom surface of the stack remain uncovered or exposed for electrical connection to the capacitor housing. Both the top portion 3080 and the bottom portion 3082 of the film conform to the shapes of the corners of the stack without a pleated region or a joint being formed. The wire extending from a terminal of the capacitor is omitted in FIG. 18B.

Figure 18C:
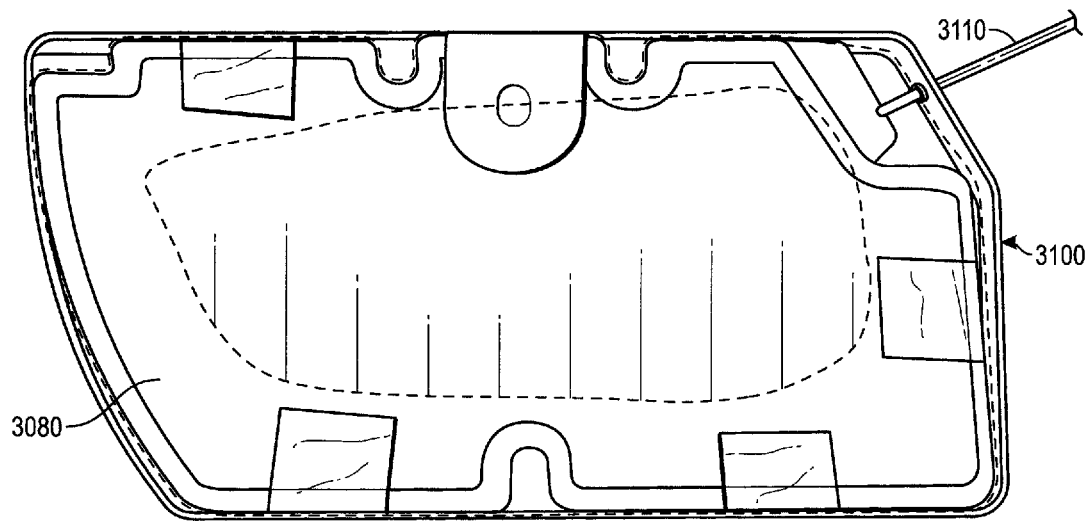
FIG. 18C is a top perspective view of a rectangular stacked electrolytic capacitor with the continuous film of FIG. 18A applied to the capacitor stack.

Another embodiment in which the film 3070 has been applied to a rectangular-shaped capacitor stack 3100 is shown in FIG. 18C. The top portion 3080 of the film and the bottom portion 3082 of the film conform to the shape of the stack and overlie peripheral portions of the top and bottom surfaces of the stack, respectively. A wire 3110 connected to a terminal of the capacitor protrudes from an edge of the stack through the aperture 3079 in the film 3070. As with the capacitor stack 3090 of FIG. 18B, the central region of both the top and bottom surfaces of the stack remain uncovered or exposed for electrical connection to the capacitor housing.

Figure 19A:
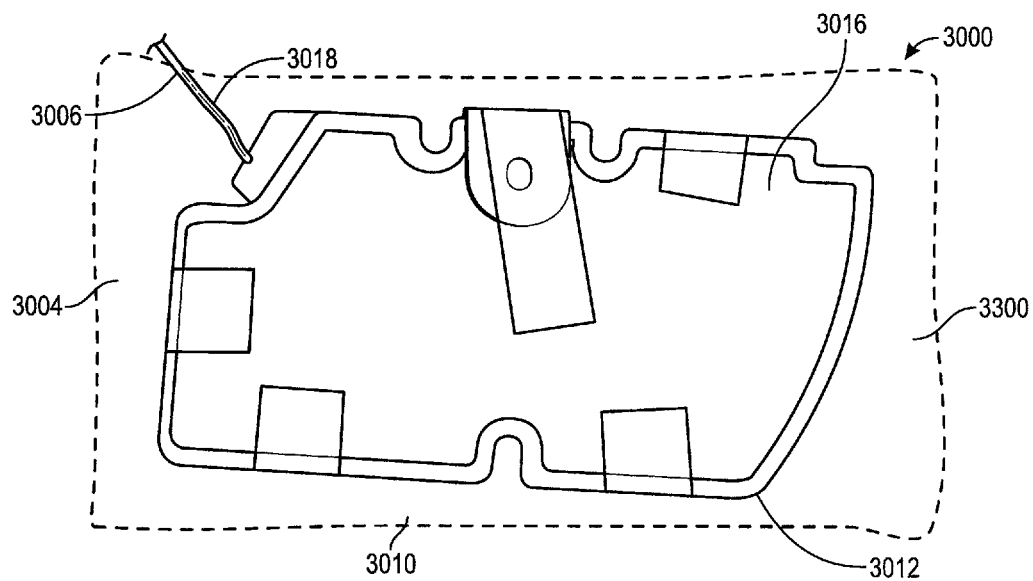
FIG. 19A is a top perspective view of a rectangular stacked electrolytic capacitor with a continuous shrinkable film arranged around the edges and the top and bottom surfaces of the capacitor.
Figure 19B:
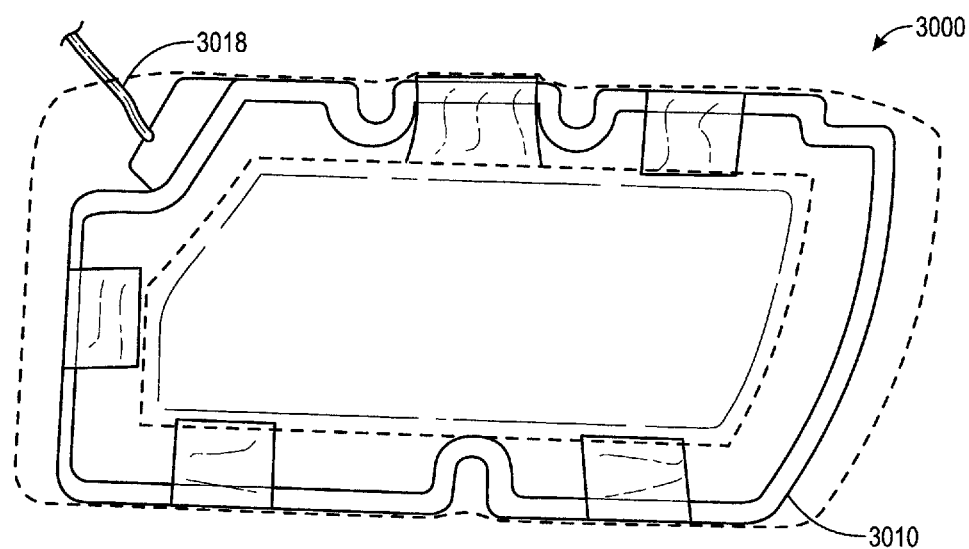
FIG. 19B is a top perspective view of the capacitor of FIG. 19A after shrinking the film and removing a portion of the shrunken film overlying a central portion of the top and bottom surfaces of the capacitor.

In a variant of what is shown in FIGS. 16A and 16B and described above, the film 3000 can be aligned with a different orientation to the capacitor stack 3010 prior to shrinking, as shown in FIG. 19A. Rather than having the continuous film 3000 wrap around the edge 3012 of the capacitor stack 3010 with the top and bottom surfaces 3014, 3016 of the stack facing the plenum openings 3002, 3004, respectively, the stack may be oriented in the plenum 3001 such that the top and bottom surfaces of the stack are covered by the film, and portions of the edge of the stack face the plenum openings. The wire 3018 can still extend from the edge 3012 of the capacitor stack 3010 through the aperture 3006 in the film. FIG. 19B shows film 3000 shrunken around capacitor stack 3010. To expose the central regions of the top and bottom surfaces 3014, 3016 of the stack, portions of the shrunken film that overlie the central regions have been removed. Removal of these portions of the film can be performed by any suitable technique that does not damage the stack. Exemplary techniques include scribing, for example manually with a blade. A laser could also be used. A chemical method to remove portions of the film could also be used. The open ends 3002, 3004 of the film 3000 can be sealed by heat crimping, or another suitable technique.

Advantageously, the present disclosure may provide for the manufacture of a stacked electrolytic capacitor configuration whose components are self-aligned, without the use of complex internal mechanical features of alignment within an interior region of the components of the stack, such as the anodes or cathodes, which may compromise performance, because the functional surface area of the components is replaced by alignment features, such as apertures in the functional areas. Further, the present disclosure of the cathode subassembly improves the manufacturability of a completed part of an electrolytic capacitor and increases long-term reliability based on the inherent elimination of failures resulting from misalignment of the components of a stack.

In addition, the present disclosure of the cathode subassembly may provide greater efficiency and lower costs in the manufacture of an electrode stack, because an individual element of a separator sheet is not added to the stack for each cathode in the stack during the manufacture of the stack. Instead, according to the present disclosure, the stack may be formed by arranging the elements of the cathode subassemblies and anodes one over the other between top and bottom cathode and separator sheets pairs, such as in the stack 2000, without providing additional separator sheets, which simplifies manufacturing process controls and also the number of elements, such as robotic elements, required to manufacture an electrode stack.

The present disclosure may further improve efficiency and lower the manufacturing cost of an electrolytic capacitor by eliminating the need to manually tape the edge portions of the capacitor stack. Eliminating the taping process can improve the accuracy in enclosing the edges of the capacitor stack, and can eliminate damage to the capacitor stack, for example, by repositioning the tape. Hence, should the occasion arise, the entire film around the edges of the stack can be removed and replaced with a new film without damaging the stack.

To summarize, the present disclosure describes a device including an electrode stack including a plurality of conductive anodes, a plurality of conductive cathodes, a plurality of separators arranged between the conductive anodes and the conductive cathodes, and a dielectric material disposed on a surface of each of the conductive anodes, the stack having a top surface, a bottom surface, and an edge extending between the top surface and the bottom surface; a continuous electrically insulating film overlying the edge, peripheral portions of the top surface and peripheral portions of the bottom surface, wherein a central portion of the top surface and a central portion of the bottom surface are exposed; and an electrolyte disposed between the conductive anodes and the conductive cathodes; and/or

- the continuous insulating film may include a continuous central region overlying the edge; and peripheral regions on opposite sides of the central region, and overlying the peripheral portions of the top surface and peripheral portions of the bottom surface; and/or
- a thickness of the film in the central region may be greater than a thickness of the film in the peripheral regions; and/or
- the peripheral regions may include pleated regions at corners of the top surface and the bottom surface, the pleated regions being formed by portions of the peripheral regions folded over each other; and/or
- the peripheral regions may include joints at corners of the top surface and the bottom surface, the joints being formed by abutting edges of the peripheral regions; and/or
- the device may be an electrolytic capacitor; and/or
- the separators may be permeable to the electrolyte; and/or
- the plurality of conductive cathodes and the plurality of separators may be arranged in a plurality of cathode subassemblies, each of the cathode subassemblies including a first separator sheet, a second separator sheet, and at least one of the conductive cathodes; and/or
- the first and the second separator sheets may comprise a nanocellulose material; and/or
- adjacent cathode subassemblies may be separated by at least one of the conductive anodes; and/or
- the first separator sheet may include a surface having a first region and a second region, the second region extending from a perimeter of the first region to a first peripheral edge of the first separator sheet, the second separator sheet may have a second peripheral edge, the second peripheral edge being substantially aligned with the first peripheral edge, and the conductive cathode being sandwiched between the first and second separator sheets and disposed within the first region, and the first and second separator sheets may be adhered to each other in a sealing region extending from the second region of the first separator sheet to a region of a surface of the second separator sheet facing the second region; and/or
- the first separator sheet may include at least one first recessed portion at the first peripheral edge aligned with at least one second recessed portion at the second peripheral edge of the second separator sheet; and/or the conductive cathode may include at least one third recessed portion at a peripheral edge thereof having a shape corresponding to a shape of the first recessed portion and a shape of the second recessed portion; and/or a shape of the conductive cathode at the peripheral edge thereof may correspond to a shape of the perimeter of the first region of the first separator sheet; and/or the first separator sheet may include adhesive material within the second region extending from the perimeter of the first region to the first peripheral edge of the first separator sheet; and/or the adhesive material may have a thickness equal to or less than a thickness of the conductive cathode; and/or the first region may include a sub-region interior to the perimeter, and a perimeter of the sub-region may have a shape and size substantially corresponding to a shape and size of a peripheral edge of the conductive cathode; and/or the conductive cathode may be spaced from adhesive material within the second region; and/or the first separator sheet may be adhered to the second separator sheet using an adhesive material; and/or the adhesive material may be configured not to be dissolved by the electrolyte; and/or a distance between the second region of the first separator sheet and the surface of the second separator sheet facing the second region may be less than or equal to a thickness of the conductive cathode; and/or the conductive cathode may include a tail portion extending out from first and second edge portions, respectively, of the first and second peripheral edges of the first and second separator sheets, and the sealing region may be remote from the first and second edge portions; and/or the first and second edge portions may be configured in relation to respective adjacent first and second edge portions of the first and second peripheral edges to form first and second outer peripheries of first and second extended portions of the first and second separator sheets, and a portion of the tail portion may be disposed between the first and second extended portions; and/or the insulating film may be a heat shrinkable material; and/or the insulating film may be an elastic material; and/or the insulating film may have a low free halide content.

Also described herein is method of making a device, the method including arranging a continuous shrinkable insulating film around a capacitor stack, the stack comprising a top surface, a bottom surface, and an edge extending between the top surface and the bottom surface, the stack including a plurality of conductive anodes, a plurality of conductive cathodes, a plurality of separators arranged between the conductive anodes and the conductive cathodes, and a dielectric material disposed on a surface of each of the conductive anodes; and shrinking the insulating film to form a continuous shrunken film overlying the edge and at least peripheral portions of the top surface and the bottom surface of the stack; and/or the shrinking step may include heating the insulating film; and/or the shrinking step may include irradiating the insulating film at a wavelength that is absorbed by the insulating film; and/or after the shrinking step, the shrunken film may overlie only the edge and the peripheral portions of the top surface and the bottom surface of the stack; and/or after the shrinking step, the shrunken film may overlie at least portions of the edge and the entirety of the top surface and the bottom surface, and the method may further comprise removing portions of the continuous film on the top and bottom surfaces to expose central portions of the top and bottom surfaces of the stack; and/or the insulating film may define a plenum having a first opening at a first end of the plenum and a second opening at a second end of the plenum opposite the first end; and/or the insulating film may be aligned with the stack such that the stack is enclosed in the plenum and the first and second openings of the plenum overlie the top surface and the bottom surface of the stack; and/or the insulating film may be aligned with the stack such that the stack is enclosed in the plenum and the first and second openings of the plenum overlie portions of the edge of the stack; and/or the insulating film may have a width between the first end of the plenum and the second end of the plenum, the width including a plurality of narrow regions, each narrow region including a first recess extending from the first end of the plenum and a second recess extending from the second end of the plenum; and/or each of the narrow regions may be aligned with a corner of the stack; and/or the insulating film may include a central region and peripheral regions on opposite sides of the central region, the peripheral regions extending towards the first opening and the second opening, and a thickness of the insulating film in the central region being greater than a thickness of the film in the peripheral regions.

Also described herein is method of making a device, the method including expanding an elastic insulating film and positioning the insulating film around a capacitor stack, the stack comprising a top surface, a bottom surface, and an edge extending between the top surface and the bottom surface, the stack including a plurality of conductive anodes, a plurality of conductive cathodes, a plurality of separators arranged between the conductive anodes and the conductive cathodes, and a dielectric material disposed on a surface of each of the conductive anodes; and contracting the insulating film, whereby the insulating film overlies the edge and at least peripheral portions of the top surface and the bottom surface of the stack; and/or the insulating film may define a plenum having a first opening and a second opening opposite the first opening; and/or the insulating film may include a central portion, a first portion and a second portion, wherein the first portion extends inwardly from one end of the central portion to define the first opening and the second portion extends inwardly from an opposite end of the central portion to define the second opening; and/or the elastic insulating film may be aligned with the stack such that the stack is enclosed in the plenum and the first and second openings of the plenum overlie the top surface and the bottom surface of the stack.

Although the disclosure herein has been described with reference to particular embodiments, it is to be understood that these embodiments are merely illustrative of the principles and applications of the present disclosure. It is therefore to be understood that numerous modifications may be made to the illustrative embodiments and that other arrangements may be devised without departing from the spirit and scope of the present disclosure as defined by the appended claims.

The invention claimed is:

1. A device, comprising:
   an electrode stack including a plurality of conductive anodes, a plurality of conductive cathodes, a plurality of separators arranged between the conductive anodes and the conductive cathodes, and a dielectric material disposed on a surface of each of the conductive anodes, the stack having a top surface, a bottom surface, and an edge extending between the top surface and the bottom surface;
   a continuous electrically insulating film overlying the edge, peripheral portions of the top surface and peripheral portions of the bottom surface, wherein a central portion of the top surface and a central portion of the bottom surface are exposed,
      the film being a single component and including a continuous central region overlying the edge and peripheral regions on opposite sides of the central region and overlying the peripheral portions of the top surface and peripheral portions of the bottom surface,
      the film having a thickness that extends from a first side of the film to a second side of the film without extending beyond the first side and without extending beyond the second side, the thickness of the film in the central region being greater than the thickness of the film in the peripheral regions,
      wherein:
         the peripheral regions include pleated regions at corners of the top surface and the bottom surface, the pleated regions being formed by portions of the peripheral regions folded over each other, or
         the peripheral regions include joints at corners of the top surface and the bottom surface, the joints being formed by abutting edges of the peripheral regions; and
   an electrolyte disposed between the conductive anodes and the conductive cathodes.

2. The device of claim 1, wherein the device is an electrolytic capacitor.

3. The device of claim 1, wherein the plurality of conductive cathodes and the plurality of separators are arranged in a plurality of cathode subassemblies, each of the cathode subassemblies including a first separator sheet, a second separator sheet, and at least one of the conductive cathodes.

4. The device of claim 3, wherein adjacent cathode subassemblies are separated by at least one of the conductive anodes.

5. The device of claim 3, wherein the first separator sheet includes a surface having a first region and a second region, the second region extending from a perimeter of the first region to a first peripheral edge of the first separator sheet,
   the second separator sheet has a second peripheral edge, the second peripheral edge being substantially aligned with the first peripheral edge, and the conductive cathode being sandwiched between the first and second separator sheets and disposed within the first region, and
   the first and second separator sheets are adhered to each other in a sealing region extending from the second region of the first separator sheet to a region of a surface of the second separator sheet facing the second region.

6. The device of claim 5, wherein the first separator sheet includes at least one first recessed portion at the first peripheral edge aligned with at least one second recessed portion at the second peripheral edge of the second separator sheet.

7. The device of claim 6, wherein the conductive cathode includes at least one third recessed portion at a peripheral edge thereof having a shape corresponding to a shape of the first recessed portion and a shape of the second recessed portion.

8. The device of claim 7, wherein a shape of the conductive cathode at the peripheral edge thereof corresponds to a shape of the perimeter of the first region of the first separator sheet.

9. The device of claim 5, wherein the first separator sheet includes adhesive material within the second region extending from the perimeter of the first region to the first peripheral edge of the first separator sheet.

10. The device of claim 5, wherein
    the first region includes a sub-region interior to the perimeter, and
    a perimeter of the sub-region has a shape and size substantially corresponding to a shape and size of a peripheral edge of the conductive cathode.

11. The device of claim 5, wherein the conductive cathode is spaced from adhesive material within the second region.

12. The device of claim 5, wherein the first separator sheet is adhered to the second separator sheet using an adhesive material.

13. The device of claim 5, wherein a distance between the second region of the first separator sheet and the surface of the second separator sheet facing the second region is less than or equal to a thickness of the conductive cathode.

14. The device of claim 5, wherein
    the conductive cathode includes a tail portion extending out from first and second edge portions, respectively, of the first and second peripheral edges of the first and second separator sheets, and
    the sealing region is remote from the first and second edge portions.

15. The device of claim 14, wherein
    the first and second edge portions are configured in relation to respective adjacent first and second edge portions of the first and second peripheral edges to form first and second outer peripheries of first and second extended portions of the first and second separator sheets, and
    a portion of the tail portion is disposed between the first and second extended portions.

16. The device of claim 1, wherein the insulating film is a heat shrinkable material.

17. The device of claim 1, wherein the insulating film has a low free halide content.

* * * * *